(12) United States Patent
Chang et al.

(10) Patent No.: US 11,003,042 B2
(45) Date of Patent: May 11, 2021

(54) SWITCHABLE IMAGE CAPTURING SYSTEM

(71) Applicant: Ability Opto-Electronics Technology Co. Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

(21) Appl. No.: 16/287,291

(22) Filed: Feb. 27, 2019

(65) Prior Publication Data

US 2020/0026140 A1    Jan. 23, 2020

Related U.S. Application Data

(60) Provisional application No. 62/699,268, filed on Jul. 17, 2018.

(51) Int. Cl.
   *G02F 1/163* (2006.01)
   *G02F 1/1514* (2019.01)
   (Continued)

(52) U.S. Cl.
   CPC ............ *G02F 1/163* (2013.01); *G02B 9/12* (2013.01); *G02B 9/34* (2013.01); *G02B 9/60* (2013.01);
   (Continued)

(58) Field of Classification Search
   CPC ........ G02F 1/163; G02F 1/1514; G02F 1/157; G02F 1/155; G02F 1/133512;
   (Continued)

(56) References Cited

U.S. PATENT DOCUMENTS

| | | | |
|---|---|---|---|
| 9,930,263 B2 * | 3/2018 | Terasawa | H04N 5/2353 |
| 2001/0005283 A1 * | 6/2001 | Osawa | G02B 27/288 |
| | | | 359/489.19 |

(Continued)

FOREIGN PATENT DOCUMENTS

TW    201205139 A1    2/2012

OTHER PUBLICATIONS

Notice of Office Action of corresponding TW application, published on Jan. 16, 2020.

*Primary Examiner* — Hung H Lam
(74) *Attorney, Agent, or Firm* — Wang Law Firm, Inc.

(57) ABSTRACT

A switchable image capturing system is provided. Through modulating light by an electro-optical switch, the light intake received by the lens assembly and the image sensor may be changed. Specifically, when the electro-optical switch receives a positive voltage, the electro-optical switch obstructs the light so that the lens assembly and the image sensor are not able to image by receiving the light; when the electro-optical switch receives a negative voltage, the electro-optical switch allows the light to pass through so that the lens assembly and the image sensor is able to image by receiving the light. Through the configuration in the aforementioned statements, the image time of the image sensor may be controlled to interrupt or continue filming according to the user's needs.

22 Claims, 12 Drawing Sheets

(51) Int. Cl.
    *G02F 1/157*      (2006.01)
    *G02B 13/00*      (2006.01)
    *G02B 9/12*      (2006.01)
    *G02B 9/34*      (2006.01)
    *G02B 9/60*      (2006.01)
    *G03B 11/04*      (2021.01)
    *H04N 5/232*      (2006.01)
    *H04N 5/225*      (2006.01)
    *G02F 1/155*      (2006.01)
    *G02F 1/1516*      (2019.01)
    *G02F 1/1335*      (2006.01)
    *G02F 1/1524*      (2019.01)
    *G03B 11/00*      (2021.01)
    *G02B 5/20*      (2006.01)
    *G02F 1/1339*      (2006.01)

(52) U.S. Cl.
    CPC ....... *G02B 13/004* (2013.01); *G02B 13/0035* (2013.01); *G02B 13/0045* (2013.01); *G02F 1/155* (2013.01); *G02F 1/157* (2013.01); *G02F 1/1514* (2019.01); *G03B 11/04* (2013.01); *H04N 5/2254* (2013.01); *H04N 5/23203* (2013.01); *G02B 5/208* (2013.01); *G02F 1/1339* (2013.01); *G02F 1/133512* (2013.01); *G02F 1/133528* (2013.01); *G02F 1/1516* (2019.01); *G02F 1/1524* (2019.01); *G02F 2001/1552* (2013.01); *G02F 2201/44* (2013.01); *G03B 11/00* (2013.01)

(58) Field of Classification Search
    CPC ........... G02F 2001/1552; G02F 1/1524; G02F 1/1516; G02F 2201/44; G02F 1/1339; G02F 1/133528; G02B 13/0035; G02B 9/12; G02B 13/004; G02B 9/34; G02B 9/60; G02B 13/0045; G02B 5/208; G02B 13/0075; G03B 11/04; G03B 11/00; H04N 5/23203; H04N 5/2254; H04N 5/238; H04N 5/2253; H04N 5/2251; H04N 5/2256; H04N 5/232
    See application file for complete search history.

(56) References Cited

U.S. PATENT DOCUMENTS

| | | | |
|---|---|---|---|
| 2001/0017985 A1* | 8/2001 | Tsuboi | H04N 5/238 396/506 |
| 2008/0197371 A1* | 8/2008 | Ottermann | H01L 51/5048 257/98 |
| 2008/0231765 A1* | 9/2008 | Horiguchi | G02F 1/133512 349/4 |
| 2011/0102565 A1* | 5/2011 | Wang | G01J 3/32 348/61 |

\* cited by examiner (a)

(b)

(a)

(b)

SWITCHABLE IMAGE CAPTURING SYSTEM

CROSS-REFERENCE TO RELATED APPLICATION

This application claims priority to and the benefit of, pursuant to 35 U.S.C. § 119, U.S. provisional patent application Ser. No. 62/699,268 filed on Jul. 17, 2018, the disclosure of which is incorporated herein in its entirety by reference.

BACKGROUND OF THE INVENTION

1. Field of the Invention

The present invention relates to a switchable image capturing system which utilizes an electro-optical switch to control light intake in an attempt to control image capturing of an image sensor in a timely manner.

2. Description of the Related Art

Recently, 3C devices have been widely applied to countless uses and the scope to which Internet of Things (TOT) can be applied has also expanded by countless degrees. A user of 3C may be possibly recorded by an optical image capturing system, such as the front camera of a cell phone or a laptop, at any time. As a consequence, if the user needs security with mobility to keep privacy safe, it is essential to timely stop the optical image capturing system from continuing recording the user.

The conventional techniques use a mechanical lens cover to obstruct light routes, namely obstructing the object side of the lens with a lens cover. However, installing a lens cover not only seems redundant but also negatively affects the convenience of using the product. Thus, how to timely and conveniently interrupt the lens filming the user and the environment to secure the privacy of the user has become a critical issue which desperately needs to be addressed.

In view of the aforementioned statement, the inventor of the present invention has designed a switchable image capturing system in an effort to overcome deficiencies in terms of current techniques so as to enhance the implementation and application in industries.

SUMMARY OF THE INVENTION

In view of the aforementioned problems, the present invention aims to provide a switchable image capturing system to tackle with the issue encountered in prior art.

On the basis of the aforementioned purpose, the present invention provides a switchable image capturing system, including at least one image sensor, at least one lens assembly, at least one electro-optical switch, and a microcontroller. Each of the image sensors is positioned in a direction in which light travels. Each of the lens assemblies are positioned in the direction in which the light travels and in front of each of the image sensors, and an optical axis of the lens assembly overlaps a central normal line of a sensing surface of the image sensors in such a way that the light focuses on the image sensor. Each of the electro-optical switches is positioned in the direction in which the light travels and each of the electro-optical switches changes the transmission rate thereof according to a control signal to obstruct a travel route of the light or to make the light pass through each of the electro-optical switches. With the disposition of the electro-optical switches, the image time of the image sensor may be controlled to interrupt or continue filming according to the user's needs.

Preferably, the microcontroller of the present invention sends a control signal to each of the electro-optical switches according to the command of the user.

Preferably, the microcontroller sends a control signal having a first voltage to each of the electro-optical switches according to the user command, and each of the electro-optical switches decreases a transmission rate thereof to obstruct a travel route of the light.

Preferably, the microcontroller sends a control signal having a second voltage to each of the electro-optical switches according to the user command, and each of the electro-optical switches increases the transmission rate thereof to make the light pass through each of the electro-optical switches.

Preferably, each of the electro-optical switches comprises a first substrate, a first transparent conductive layer, an auxiliary electrode layer, an electrolyte layer, an electrochromic layer, a second transparent conductive layer, and a second substrate. The first transparent conductive layer is disposed on the first substrate. The auxiliary electrode layer is disposed on the first transparent conductive layer. The electrolyte layer is disposed on the auxiliary electrode layer. The electrochromic layer is disposed on the electrolyte layer. The second transparent conductive layer is disposed on the electrochromic layer. The second substrate is disposed on the second transparent conductive layer.

Preferably, the placement position of each of the electro-optical switches is perpendicular to the direction in which the light travels.

Preferably, each of the electro-optical switches is positioned in front of each of the lens assemblies, and the first substrate and the second substrate are positioned at a side adjacent to the lens assembly.

Preferably, each of the electro-optical switches is positioned between each of the lens assemblies and each of the image sensors, and the first substrate and the second substrate are positioned at a side adjacent to the lens assembly.

Preferably, each of the electro-optical switches is positioned between two lenses adjacent to each of the lens assemblies.

Preferably, each of the electro-optical switches further includes a sealing structure. The sealing structure is disposed between the first substrate and the second substrate and surrounds the auxiliary electrode layer, the electrolyte layer, and the electrochromic layer.

Preferably, materials of the electrochromic layer include a transition metal oxide, an intercalated compound, and an organic compound.

Preferably, each of the electro-optical switches includes a first substrate, a first transparent conductive layer, a light-shielding layer, a second transparent conductive layer, and a second substrate. The first transparent conductive layer is disposed on the first substrate. The light-shielding layer is disposed on the first transparent conductive layer. The second transparent conductive layer is disposed on the light-shielding layer. The second substrate is disposed on the second transparent conductive layer.

Preferably, the placement position of each of the electro-optical switches is perpendicular to the direction in which the light travels.

Preferably, each of the electro-optical switches is positioned in front of each of the lens assemblies, and the first substrate and the second substrate are positioned at a side adjacent to the lens assembly.

Preferably, each of the electro-optical switches is positioned between each of the lens assemblies and each of the image sensors, and the first substrate and the second substrate are positioned at a side adjacent to the lens assembly.

Preferably, each of the electro-optical switches is positioned between two lenses adjacent to each of the lens assemblies.

Preferably, each of the electro-optical switches further includes a sealing structure. The sealing structure is disposed between the first substrate and the second substrate and surrounds the light-shielding layer.

Preferably, materials of the light-shielding layer include suspended particles and a polymer dispersed liquid crystal.

Preferably, the switchable image capturing system of the present invention further includes a polarizer, and the polarizer is disposed between the lens assembly and the electro-optical switch.

Preferably, each of the lens assemblies includes three lenses having refractive power, which are a first lens, a second lens, and a third lens displayed sequentially from an object side to an image side. Each of the lens assemblies satisfies the following conditions:

$$0.1 \le InTL/HOS \le 0.95;$$

wherein, HOS is the distance from an object side surface of the first lens to the sensing surface of the image sensor on an optical axis; InTL is the distance from an object side surface of the first lens to an image side surface of the third lens on an optical axis.

Preferably, each of the lens assemblies includes four lenses having refractive power, which are a first lens, a second lens, a third lens, and a fourth lens displayed sequentially from an object side to an image side. Each of the lens assemblies satisfies the following conditions:

$$0.1 \le InTL/HOS \le 0.95;$$

wherein, HOS is the distance from an object side surface of the first lens to the sensing surface of the image sensor on an optical axis; InTL is the distance from an object side surface of the first lens to an image side surface of the fourth lens on an optical axis.

Preferably, each of the lens assemblies includes five lenses having refractive power, which are a first lens, a second lens, a third lens, a fourth lens, and a fifth lens displayed sequentially from an object side to an image side. Each of the lens assemblies satisfies the following conditions:

$$0.1 \le InTL/HOS \le 0.95;$$

wherein, HOS is the distance from an object side surface of the first lens to the sensing surface of the image sensor on an optical axis; InTL is the distance from an object side surface of the first lens to an image side surface of the fifth lens on an optical axis.

On the basis of the aforementioned purposes, the switchable image capturing system of the present invention may be applied to electronic portable devices, electronic wearable devices, electronic monitoring devices, electronic information devices, electronic communication devices, machine vision devices, vehicle electronic devices, and any combination thereof.

Accordingly, for the switchable image capturing system of the present invention, the image time of the image sensor may be controlled via modulating the electro-optical switches to interrupt or continue filming according to the user's needs.

DESCRIPTION OF THE PREFERRED EMBODIMENTS

The advantages, features, and technical methods of the present invention are to be explained in detail with reference to the exemplary embodiments and the figures for the purpose of being more easily to be understood. Moreover, the present invention may be realized in different forms, and should not be construed as being limited to the embodiments set forth herein. Conversely, for a person skilled in the art, the embodiments provided shall make the present invention convey the scope more thoroughly, comprehensively, and completely. In addition, the present invention shall be defined only by the appended claims.

Figure 1:
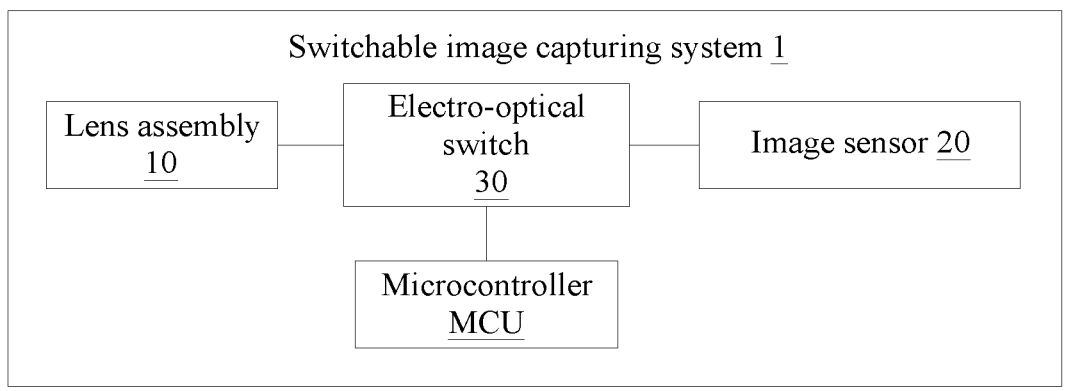
FIG. 1 depicts a block diagram of the switchable image capturing system according to the present invention.

Please refer to FIG. 1, which depicts a block diagram of the switchable image capturing system according to the present invention. As shown in FIG. 1, the switchable image capturing system of the present invention includes at least one image sensor 20, at least one lens assembly 10, at least one electro-optical switch 30, and a microcontroller MCU. Each of the image sensors 20 is positioned in a direction in which light travels. Each of the lens assemblies 10 are positioned in the direction in which the light travels and in front of each of the image sensors 20, and an optical axis of the lens assembly 10 overlaps a central normal line of a sensing surface of the image sensors in such a way that the light focuses on the image sensor 20. Each of the electro-optical switches 30 is positioned in the direction in which the light travels and each of the electro-optical switches 30 changes the transmission rate thereof according to a control signal to obstruct a travel route of the light or to make the light pass through each of the electro-optical switches 30. The microcontroller MCU is electrically connected to each of the electro-optical switches 30 and sends the control signal to each of the electro-optical switches 30 according to a command of a user. With the disposition of the electro-optical switches 30, the image time of the image sensor 20 may be controlled and the filming of the image sensor 20 may be interrupted or continued according to the user's needs.

It should be noted that the number of the image sensors 20, the lens assemblies 10, and the electro-optical switches 30 are changed according to the user's needs and engineer needs for design. Hence, the number of the image sensors 20, the lens assemblies 10, and the electro-optical switches 30 are not limited herein.

Herein, the microcontroller MCU controlling each of the electro-optical switches 30 is explained in detail in the following steps: (1) When a user does not need to film with the image sensor 20, the user issues a user command to the microcontroller MCU. The microcontroller MCU sends a control signal having a first voltage to each of the electro-optical switches 30 according to the user command. The first voltage is a positive voltage, and each of the electro-optical switches 30 decreases a transmission rate thereof to obstruct a travel route of the light so that each of the image sensors 20 does not receive light, resulting in not performing filming and imaging. (2) When the user needs to film with the image sensor 20, the user issues a user command to the microcontroller MCU. The microcontroller MCU sends a control signal having a second voltage to each of the electro-optical switches 30 according to the user command. Each of the electro-optical switches 30 increases a transmission rate thereof to make the light pass through each of the electro-optical switches 30 so that each of the image sensors 20 receives light, resulting in performing filming and imaging. In addition, the value of the first voltage may also be adjusted according to the user's needs so that part of the light passes through each of the electro-optical switches 30 instead of completely obstructing the light entering each of the image sensors.

Figure 2:
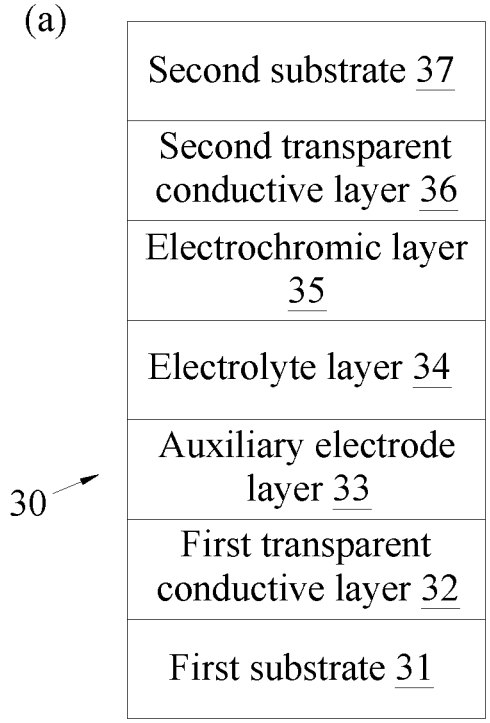
FIG. 2 depicts a schematic diagram of the electro-optical switch of the switchable image capturing system according to the first embodiment of the present invention.
Figure 2:
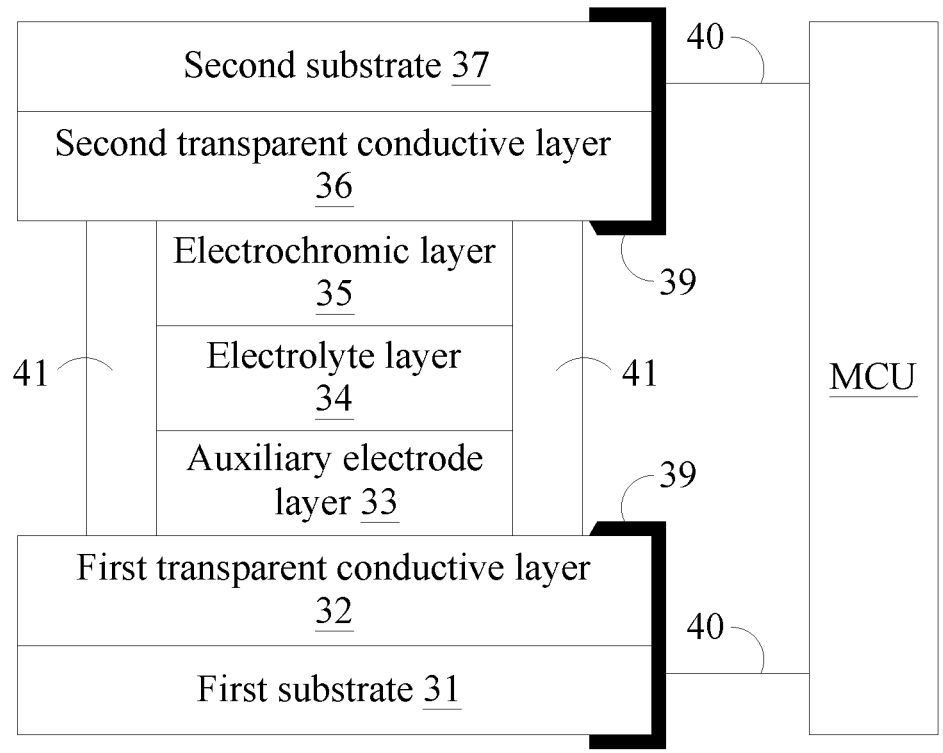

Please refer to FIG. 2, which depicts a schematic diagram of the electro-optical switch of the switchable image capturing system according to the first embodiment of the present invention. FIG. 2 (a) depicts a layer structural diagram of the electro-optical switch of the switchable image capturing system according to the first embodiment of the present invention. As shown in FIG. 2 (a), a single electro-optical switch of the present invention includes a first substrate 31, a first transparent conductive layer 32, an auxiliary electrode layer 33, an electrolyte layer 34, an electrochromic layer 35, a second transparent conductive layer 36, a second substrate 37, and a sealing structure 41. The first transparent conductive layer 32 is disposed on the first substrate 31. The auxiliary electrode layer 33 is disposed on the first transparent conductive layer 32. The electrolyte layer 34 is disposed on the auxiliary electrode layer 33. The electrochromic layer 35 is disposed on the electrolyte layer 34. The second transparent conductive layer 36 is disposed on the electrochromic layer 35. The second substrate 37 is disposed on the second transparent conductive layer 36. The sealing structure 41 is disposed between the first substrate 31 and the second substrate 37 and surrounds the auxiliary electrode layer 33, the electrolyte layer 34, and the electrochromic layer 35 in an attempt to prevent the solution in the electrolyte layer 34 from flowing out. FIG. 2 (b) depicts a cross-section diagram of the electro-optical switch of the switchable image capturing system according to the first embodiment of the present invention. As shown in FIG. 2 (b), U-shape electrodes 39 may be disposed on the electro-optical switch 30. The electrodes 39 may be formed by respectively cladding the end of the first substrate 31 and the first transparent conductive layer 32 as well as the end of the second substrate 31 and the second transparent conductive layer 36 by using metal foils. The microcontroller MCU may be electrically connected to the electrodes 39 via wires 40 so that voltage may be sent to the electro-optical switch 30. In an embodiment, the electrodes 39 may be formed outside of the sealing structure 41 without overlapping with the auxiliary electrode layer 33, the electrolyte layer 34, and the electrochromic layer 35. In another embodiment, the auxiliary electrode layer 33, the electrolyte layer 34, and the electrochromic layer 35 overlapping with the electrodes 39 may be activated.

Wherein, the setup of the electro-optical switch of the present invention is described as follows: The first substrate 31 and the second substrate 37 may be selected from one of a glass substrate, a quartz substrate, a sapphire substrate, and a silicon carbide (SiC) substrate. The material of the first transparent conductive layer 32 and the second transparent conductive layer 36 includes ITO, ZnO, AlGaInSnO, AZO, $SnO_2$, $In_2O_3$, SnZnO, or graphene. The material of the auxiliary electrode layer 33 includes $NiO_x$, $Ni(OH)_2$, or $Co(OH)_2$. The material of the electrolyte layer 34 includes electrolyte of salts including $ZrO_2$, $HfO_2$, $Ta_2O_5$, an oxide of $SiO_2$, $MgF_2$, and $CeF_3$, or includes electrolyte of acids including $LiClO_4$ or $H_3PO_4$ and organic macromolecules such as CPE (cross-linked polyether), PEO (poly (ethylene oxide)), PVA (poly (vinyl alcohol)), and PVP (poly (vinyl piperidine)). The material of the electrochromic layer 35 includes at least one selected from the group consisting of transition metal oxides, intercalated compounds, and organic compounds. The transition metal oxides include $WO_3$, $V_2O_5$, $NiO_x$, $MoO_3$, $Nb_2O_5$, $TiO_2$, or $Rh_2O_3$. The intercalated compounds include $Fe_4[Fe(CN)_6]3$, $Fe_4[Ru$ (CN)$_6$]$_3$, CoFe(CN)$_6$, KVFe(CN)$_6$, or InFe(CN)$_6$. The organic compounds include pyrazoline, poly(aniline), and tetrathiafulvalene.

It should be noted that the electro-optical switch 30 according to the first embodiment of the present invention prompts oxidation-reduction reaction to occur by applying voltages to the electrochromic layer. The ions required for the oxidation-reduction are provided by the electrolyte layer 34. Specifically, when the electrochromic layer 35 undergoes a reduction reaction, the electrochromic layer 35 begins to change to a color such as blue, green, or yellow. The color of the electrochromic layer 35 is selected according to the aforementioned materials having various colors, thus achieving the purpose of obstructing light. When the electrochromic layer 35 undergoes an oxidation reaction, the electrochromic layer 35 begins to become transparent and colorless, which makes the visible light band penetrate the electrochromic layer 35, further allowing light to enter the image sensor 20.

It is worth mentioning that the electrochromic layer 35 can be different colors according to requirements, so the electro-optical switch 30 having the electrochromic layer 35 may be applied to a filter. For instance, the electrochromic layer 35 of the electro-optical switch 30 becomes green when a positive voltage is applied, with only the green light band (500 nm-550 nm) being allowed to pass through and preventing the light with other colors from passing through the electro-optical switch 30.

Figure 3:
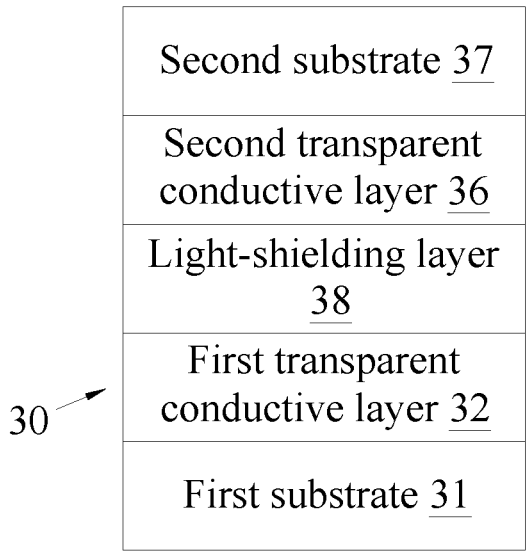
FIG. 3 depicts a schematic diagram of the electro-optical switch of the switchable image capturing system according to the second embodiment of the present invention.
Figure 3:
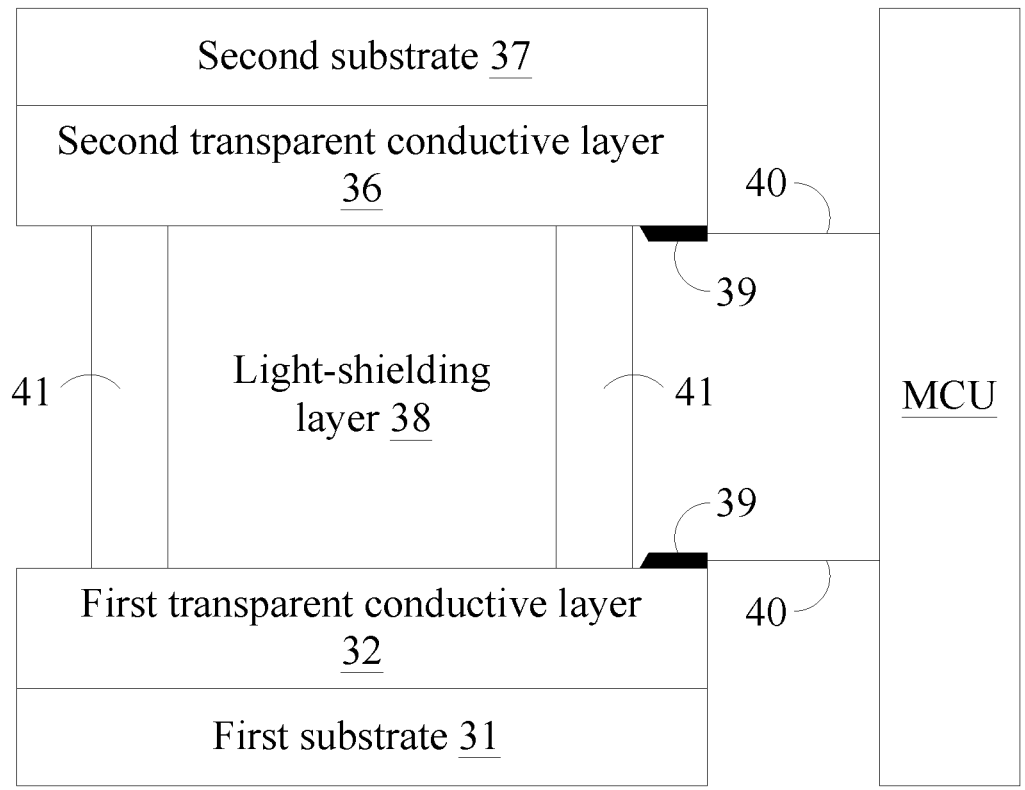

Please refer to FIG. 3, which depicts a schematic diagram of the electro-optical switch of the switchable image capturing system according to the second embodiment of the present invention. FIG. 3 (a) depicts a layer structural diagram of the electro-optical switch of the switchable image capturing system according to the second embodiment of the present invention. As shown in FIG. 3 (a), each of the single electro-optical switches 30 includes a first substrate 31, a first transparent conductive layer 32, a light-shielding layer 38, a second transparent conductive layer 36, a second substrate 37, and a sealing structure 41. The first transparent conductive layer 32 is disposed on the first substrate 31. The light-shielding layer 38 is disposed on the first transparent conductive layer 32. The second transparent conductive layer 36 is disposed on the light-shielding layer 38. The second substrate 37 is disposed on the second transparent conductive layer 36. The sealing structure 41 is disposed between the first substrate 31 and the second substrate 37 and surrounds the light-shielding layer 38 in an attempt to prevent the solution in the light-shielding layer 38 from flowing out. FIG. 3 (b) depicts a cross-section diagram of the electro-optical switch of the switchable image capturing system according to the second embodiment of the present invention. As shown in FIG. 3 (b), electrodes 39 may be disposed on the electro-optical switch 30. The electrodes 39 may be formed on the first transparent conductive layer 32 and second transparent conductive layer 36 in a form of a contact pad. The microcontroller MCU may be electrically connected to the electrodes 39 via wires 40 so that voltage may be sent to the electro-optical switch 30. The electrodes 39 may be formed on the first transparent conductive layer 32 and the second transparent conductive layer 36 by using metal materials, conductive adhesive, or other highly conductive materials collocated with the mesh electrode and the optical lithography patterning method. In an embodiment, the electrodes 39 may be formed outside of the sealing structure 41 without overlapping with the light-shielding layer 38. In another embodiment, the light-shielding layer 38 overlapping with the electrodes 39 may be activated. In an embodiment, the electrodes 39 may be manufactured by using metal materials, conductive adhesive, or other highly conductive materials collocated with the mesh electrode and the optical lithography patterning method.

Wherein, the material of the light-shielding layer 38 includes suspended particles and a polymer dispersed liquid crystal. Since the molecular arrangement direction of such material may be rotated when undertaking voltages, the purpose of obstructing light may be achieved. The auxiliary electrode layer 33 and the electrolyte layer 34 may therefore not be needed. Moreover, since the molecular arrangement direction of the light-shielding layer 38 may be rotated owing to voltages, making the light polarized, a polarizer may be disposed between the lens assembly 10 and the electro-optical switch 30 in such a way that the polarized angle of the light may be more diverse.

Figure 4:
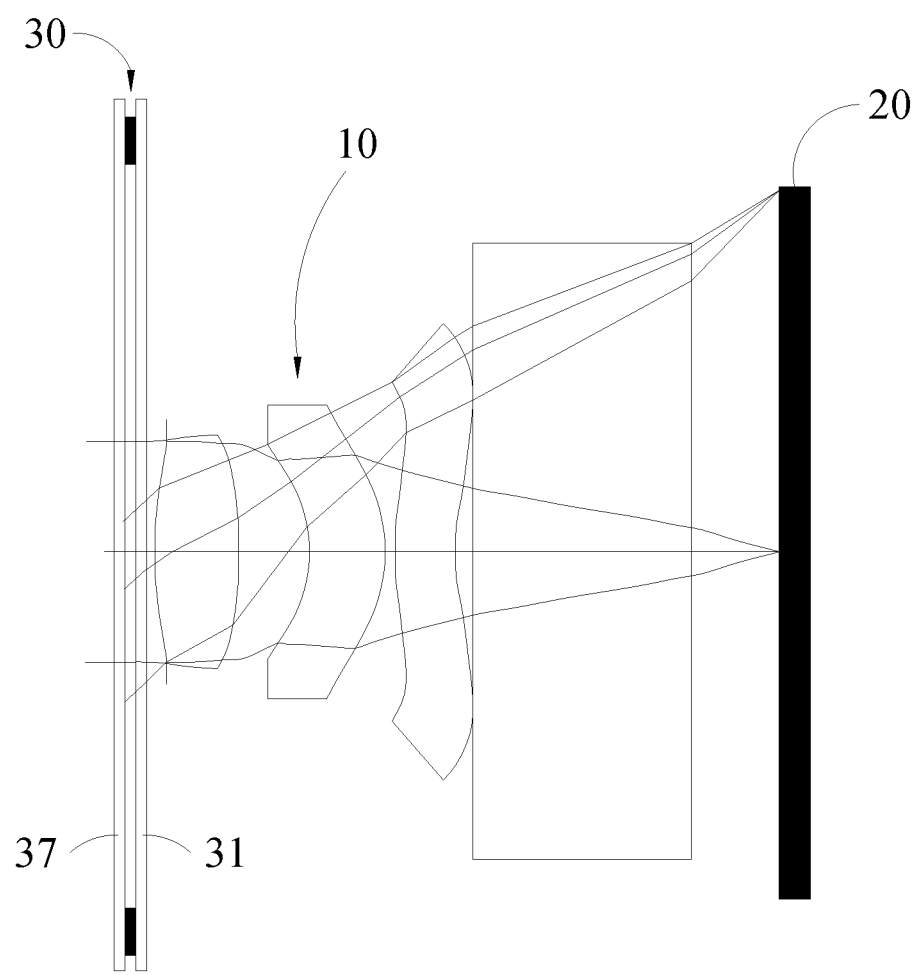
FIG. 4 depicts a configuration diagram of the switchable image capturing system according to the first embodiment of the present invention.

Please refer to FIG. 4, which depicts a configuration diagram of the switchable image capturing system according to the first embodiment of the present invention. As shown in FIG. 4, the lens assembly 10 is set with three lenses. The placement position of the electro-optical switch 30 is perpendicular to the direction in which the light travels. The electro-optical switch 30 is positioned in front of the lens assembly 10 and the first substrate 31 of the electro-optical switch 30 is positioned at a side adjacent to the lens assembly 10. The manner in which the electro-optical switch 30 is placed is not particularly limited, and only the electro-optical switch 30 is positioned in front of the lens assembly 10. In another embodiment, the second substrate 37 of the electro-optical switch 30 is positioned at a side adjacent to the lens assembly 10.

Figure 5:
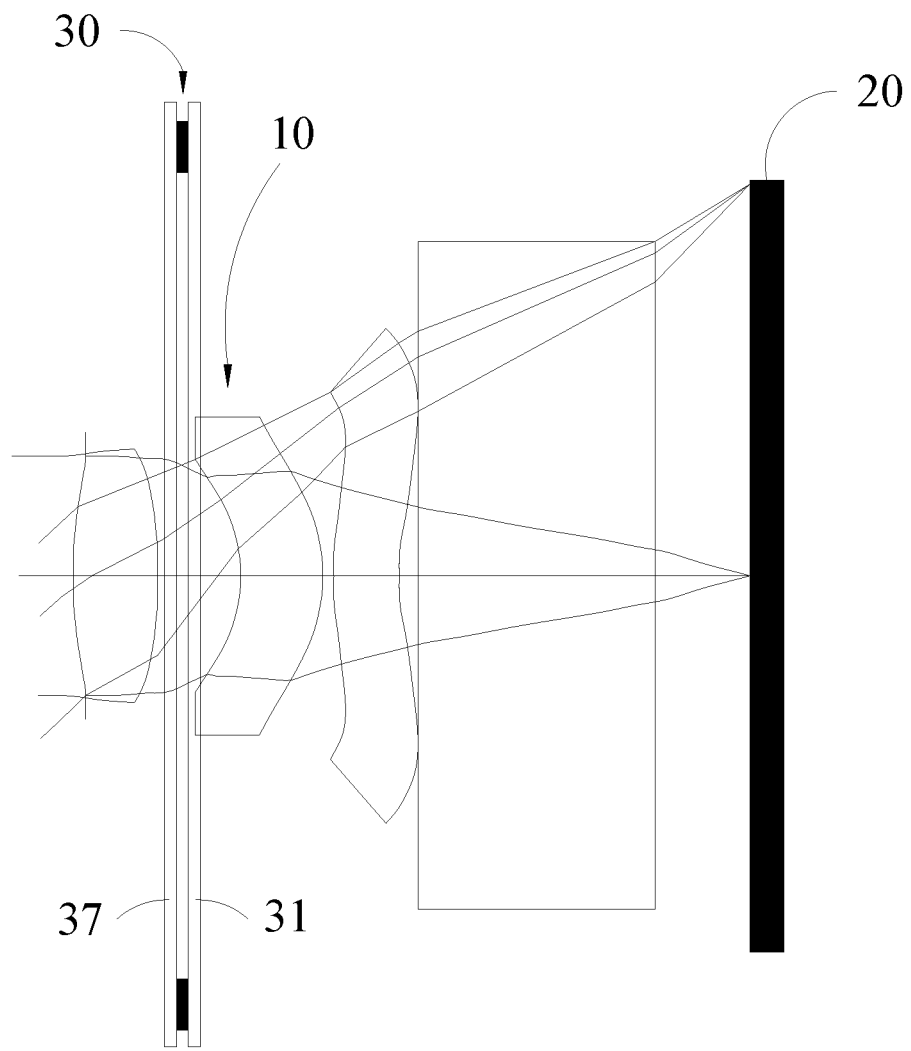
FIG. 5 depicts a configuration diagram of the switchable image capturing system according to the second embodiment of the present invention.

Please refer to FIG. 5, which depicts a configuration diagram of the switchable image capturing system according to the second embodiment of the present invention. As shown in FIG. 5, the lens assembly 10 is set with three lenses. The placement position of the electro-optical switch 30 is perpendicular to the direction in which the light travels. The electro-optical switch 30 is positioned between two lenses adjacent to each of the lens assemblies.

Figure 6:
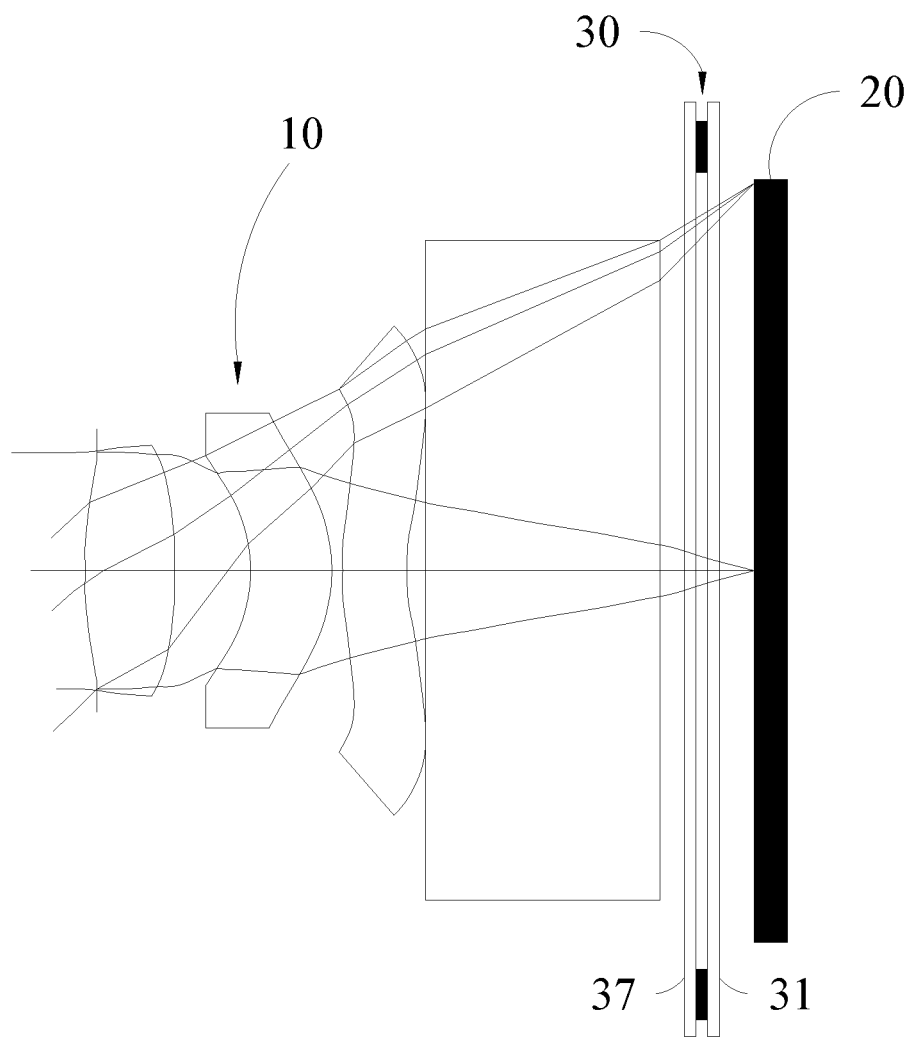
FIG. 6 depicts a configuration diagram of the switchable image capturing system according to the third embodiment of the present invention.

Please refer to FIG. 6, which depicts a configuration diagram of the switchable image capturing system according to the third embodiment of the present invention. As shown in FIG. 6, the lens assembly 10 is set with three lenses. The placement position of the electro-optical switch 30 is perpendicular to the direction in which the light travels. The electro-optical switch 30 is positioned between the lens assembly 10 and the image sensor 20. The first substrate 31 and the second substrate 37 of the electro-optical switch 30 may be positioned at a side adjacent to the lens assembly 10. The manner in which the electro-optical switch 30 is placed is not particularly limited, and only the electro-optical switch 30 is positioned in front of the lens assembly 10.

It should be noted that the configurations of FIGS. 4 to 6 are applicable to the electro-optical switches 30 of the first embodiment and the second embodiment. The manner in which each of the electro-optical switches 30 is placed may be selected from FIGS. 4 to 6. Each of the electro-optical switches 30 may be placed in the same as or different way from each other. That is, the manner in which each of the electro-optical switches 30 is placed may be the same or different. For instance, some electro-optical switches 30 are configured according to FIG. 4; another electro-optical switches 30 are configured according to FIG. 5; the other electro-optical switches 30 are configured according to FIG. 6. Each of the electro-optical switches 30 may be the electro-optical switch 30 of the first embodiment and the second embodiment. All of the electro-optical switches 30 are the electro-optical switch 30 of the first embodiment or the electro-optical switch 30 of the second embodiment. It also may be that some electro-optical switches 30 are the electro-optical switch 30 of the first embodiment, and the other electro-optical switch 30 is the electro-optical switch 30 of the second embodiment.

In some embodiments, the lens assembly 10 includes three lenses with refractive power, which are a first lens, a second lens, and a third lens sequentially displayed from an object side to an image side, and the lens assembly 10 satisfies the following condition: $0.1 \leq \text{InTL/HOS} \leq 0.95$; wherein, HOS is a distance from an object side surface of the first lens to the image side surface on an optical axis; InTL is a distance from an object side surface of the first lens to an image side surface of the third lens on an optical axis.

In some embodiments, the lens assembly 10 includes four lenses with refractive power, which are a first lens, a second lens, a third lens, and a fourth lens sequentially displayed from an object side to an image side, and the lens assembly 10 satisfies the following condition: $0.1 \leq \text{InTL/HOS} \leq 0.95$; wherein, HOS is a distance from an object side surface of the first lens to the image side surface on an optical axis; InTL is a distance from an object side surface of the first lens to an image side surface of the fourth lens on an optical axis.

In some embodiments, the lens assembly 10 includes five lenses with refractive power, which are a first lens, a second lens, a third lens, a four lens, and a fifth lens sequentially displayed from an object side to an image side, and the lens assembly 10 satisfies the following condition: $0.1 \leq \text{InTL/HOS} \leq 0.95$; wherein, HOS is a distance from an object side surface of the first lens to the image side surface on an optical axis; InTL is a distance from an object side surface of the first lens to an image side surface of the fifth lens on an optical axis.

In addition to the structural embodiment as mentioned above, an optical embodiment related to the lens assembly 10 is to be described as follows. The switchable image capturing system of the present invention may be designed using three operational wavelengths, namely 486.1 nm, 587.5 nm, and 656.2 nm. Wherein, 587.5 nm is the main reference wavelength for the technical features. The switchable image capturing system of the present invention may be designed using five operational wavelengths, namely 470 nm, 510 nm, 555 nm, 610 nm 650 nm. Wherein, 555 nm is the main reference wavelength for the technical features.

PPR is the ratio of the focal length f of the lens assembly 10 to a focal length fp of each of lenses with positive refractive power. NPR is the ratio of the focal length f of the lens assembly 10 to the focal length fn of each of lenses with negative refractive power. The sum of the PPR of all the lenses with positive refractive power is ΣPPR. The sum of the NPR of all the lenses with negative refractive power is ΣNPR. Controlling the total refractive power and total length of the lens assembly 10 may be achieved when the following conditions are satisfied: $0.5 \leq \Sigma\text{PPR}/|\Sigma\text{NPR}| \leq 15$. Preferably, the following conditions may be satisfied: $1 \leq \Sigma\text{PPR}/|\Sigma\text{NPR}| \leq 3.0$.

In addition, HOI is defined as half a diagonal of a sensing field of the image sensor 20 (i.e., the imaging height or the maximum imaging height of the switchable image capturing system). HOS is a distance on the optical axis from an object side of the first lens to the image plane, which satisfies the following conditions: $\text{HOS/HOI} \leq 50$; and $0.5 \leq \text{HOS/f} \leq 150$. Preferably, the following conditions are satisfied: $1 \leq \text{HOS/HOI} \leq 40$; $1 \leq \text{HOS/f} \leq 140$. Therefore, the switchable image capturing system may be maintained in miniaturization so that the module may be equipped on thin and portable electronic products.

In addition, in an embodiment, at least one aperture may be disposed in the lens assembly 10 of the present invention to reduce stray light and enhance image quality.

Specifically, the disposition of the aperture may be a front aperture or a middle aperture in the lens assembly 10 of the present invention. Wherein, the front aperture is the aperture disposed between the shot object and the first lens. The front aperture is the aperture disposed between the first lens and the image plane. If the aperture is the front aperture, a longer distance may be created between the exit pupil and the image plane in the lens assembly 10 so that more optical elements may be accommodated and the efficiency of image sensor elements receiving images may be increased. If the aperture is the middle aperture, the field of view of the system may be expended in such a way that the optical image capturing module has the advantages of a wide-angle lens. InS is defined as the distance from the aforementioned aperture to the image plane, which satisfies the following condition: $0.1 \leq \text{InS/HOS} \leq 1.1$. Therefore, the features of the lens assembly 10 maintained in miniaturization and having wide-angle may be attended simultaneously.

In the lens assembly 10 of the present invention, InTL is a distance on the optical axis from an object side of the first lens to an image side surface of the sixth lens. ΣTP is the sum of the thicknesses of all the lenses with refractive power on the optical axis. The following conditions are satisfied: $0.1 \leq \Sigma\text{TP/InTL} \leq 0.9$. Therefore, the contrast ratio of system imaging and the yield rate of lens manufacturing may be attended simultaneously. Moreover, an appropriate back focal length is provided to accommodate other elements.

R1 is the curvature radius of the object side surface of the first lens. R2 is the curvature radius of the image side surface of the first lens. The following condition is satisfied: $0.001 \leq |R1/R2| \leq 25$. Therefore, the first lens is equipped with appropriate intensity of positive refractive power to prevent the spherical aberration from increasing too fast. Preferably, the following condition is satisfied: $0.01 \leq |R1/R2| < 12$.

R11 is the curvature radius of the object side surface of the sixth lens. R12 is the curvature radius of the image side surface of the sixth lens. This following condition is satisfied: $-7 < (R11-R12)/(R11+R12) < 50$. Therefore, it is advantageous to correct the astigmatism generated by the lens assembly 10.

IN12 is the distance between the first lens and the second lens on the optical axis. The following condition is satisfied: $\text{IN12/f} \leq 60$. Therefore, it is beneficial to improve the chromatic aberration of the lenses so as to enhance the performance.

IN56 is the distance between the fifth lens and the sixth lens on the optical axis. The following condition is satisfied: $\text{IN56/f} \leq 3.0$. Therefore, it is beneficial to improve the chromatic aberration of the lens so as to enhance the performance.

TP1 and TP2 are respectively the thicknesses of the first lens and the second lens on the optical axis. The following condition is satisfied: $0.1 \leq (\text{TP1}+\text{IN12})/\text{TP2} \leq 10$. Therefore, it is beneficial to control the sensitivity produced by the optical image capturing module so as to enhance the performance.

TP5 and TP6 are respectively the thicknesses of the fifth lens and the sixth lens on the optical axis. The following condition is satisfied: $0.1 \leq (\text{TP6}+\text{IN56})/\text{TP5} \leq 15$. Therefore, it is beneficial to control the sensitivity produced by the optical image capturing module so as to enhance the performance.

TP2, TP3, and TP4 are respectively the thicknesses of the second lens, the third lens, and the fourth lens on the optical axis. IN23 is the distance between the second lens and the third lens on the optical axis. IN45 is the distance between the third lens and the fourth lens on the optical axis. InTL is the distance from an object side surface of the first lens to an image side surface of the sixth lens. The following condition is satisfied: $0.1 \leq TP4/(IN34+TP4+IN45) < 1$. Therefore, it is beneficial to slightly correct the aberration generated by the incident light advancing in the process layer upon layer so as to decrease the overall height of the system.

In the lens assembly 10, HVT61 is the distance perpendicular to the optical axis between a critical point C61 on an object side surface of the sixth lens and the optical axis. HVT62 is the distance perpendicular to the optical axis between a critical point C62 on an image side surface of the sixth lens and the optical axis. SGC61 is a distance parallel to the optical axis from an axial point on the object side surface of the sixth lens to the critical point C61. SGC62 is the distance parallel to the optical axis from an axial point on the image side surface of the sixth lens to the critical point C62. The following conditions may be satisfied: $0 \text{ mm} \leq HVT61 \leq 3$ mm; $0 \text{ mm} < HVT62 \leq 6$ mm; $0 \leq HVT61/HVT62$; $0 \text{ mm} \leq |SGC61| \leq 0.5$ mm; $0 \text{ mm} < |SGC62| \leq 2$ mm; and $0 < |SGC62|/(|SGC62|+TP6) \leq 0.9$. Therefore, it may be effective to correct the aberration of the off-axis view field.

The lens assembly 10 of the present invention satisfies the following condition: $0.2 \leq HVT62/HOI \leq 0.9$. Preferably, the following condition may be satisfied: $0.3 \leq HVT62/HOI \leq 0.8$. Therefore, it is beneficial to correct the aberration of the surrounding view field of the lens assembly 10.

The lens assembly 10 of the present invention satisfies the following condition: $0 \leq HVT62/HOS \leq 0.5$. Preferably, the following condition may be satisfied: $0.2 \leq HVT62/HOS \leq 0.45$. Hereby, it is beneficial to correct the aberration of the surrounding view field of the lens assembly 10.

In the lens assembly 10 of the present invention, SGI611 denotes a distance parallel to an optical axis from an inflection point on the object side surface of the sixth lens which is nearest to the optical axis to an axial point on the object side surface of the sixth lens. SGI621 denotes a distance parallel to an optical axis from an inflection point on the image side surface of the sixth lens which is nearest to the optical axis to an axial point on the image side surface of the sixth lens. The following condition are satisfied: $0 < SGI611/(SGI611+TP6) \leq 0.9$; $0 < SGI621/(SGI621+TP6) \leq 0.9$. Preferably, the following conditions may be satisfied: $0.1 \leq SGI611/(SGI611+TP6) \leq 0.6$; $0.1 \leq SGI621/(SGI621+TP6) \leq 0.6$.

SGI612 denotes a distance parallel to the optical axis from the inflection point on the object side surface of the sixth lens which is the second nearest to the optical axis to an axial point on the object side surface of the sixth lens. SGI622 denotes a distance parallel to an optical axis from an inflection point on the image side surface of the sixth lens which is the second nearest to the optical axis to an axial point on the image side surface of the sixth lens. The following conditions are satisfied: $0 < SGI612/(SGI612+TP6) \leq 0.9$; $0 < SGI622/(SGI622+TP6) \leq 0.9$. Preferably, the following conditions may be satisfied: $0.1 \leq SGI612/(SGI612+TP6) \leq 0.6$; $0.1 \leq SGI622/(SGI622+TP6) \leq 0.6$.

HIF611 denotes the distance perpendicular to the optical axis between the inflection point on the object side surface of the sixth lens which is the nearest to the optical axis and the optical axis. HIF621 denotes the distance perpendicular to the optical axis between an axial point on the image side surface of the sixth lens 16 and an inflection point on the image side surface of the sixth lens which is the nearest to the optical axis. The following conditions are satisfied: $0.001 \text{ mm} \leq |HIF611| \leq 5$ mm; $0.001 \text{ mm} \leq |HIF621| \leq 5$ mm. Preferably, the following conditions may be satisfied: $0.1 \text{ mm} \leq |HIF611| \leq 3.5$ mm; $1.5 \text{ mm} \leq |HIF621| \leq 3.5$ mm.

HIF612 denotes the distance perpendicular to the optical axis between the inflection point on the object side surface of the sixth lens which is the second nearest to the optical axis and the optical axis. HIF622 denotes the distance perpendicular to the optical axis between an axial point on the image side surface of the sixth lens and an inflection point on the image side surface of the sixth lens which is the second nearest to the optical axis. The following conditions are satisfied: $0.001 \text{ mm} \leq |HIF612| \leq 5$ mm; $0.001 \text{ mm} \leq |HIF622| \leq 5$ mm. Preferably, the following conditions may be satisfied: $0.1 \text{ mm} \leq |HIF622| \leq 3.5$ mm; $0.1 \text{ mm} \leq |HIF612| \leq 3.5$ mm.

HIF613 denotes the distance perpendicular to the optical axis between the inflection point on the object side surface of the sixth lens which is the third nearest to the optical axis and the optical axis. HIF623 denotes the distance perpendicular to the optical axis between an axial point on the image side surface of the sixth lens and an inflection point on the image side surface of the sixth lens which is the third nearest to the optical axis. The following conditions are satisfied: $0.001 \text{ mm} \leq |HIF613| \leq 5$ mm; $0.001 \text{ mm} \leq |HIF623| \leq 5$ mm. Preferably, the following conditions may be satisfied: $0.1 \text{ mm} \leq |HIF623| \leq 3.5$ mm; $0.1 \text{ mm} \leq |HIF613| \leq 3.5$ mm.

HIF614 denotes the distance perpendicular to the optical axis between the inflection point on the object side surface of the sixth lens which is the fourth nearest to the optical axis and the optical axis. HIF624 denotes the distance perpendicular to the optical axis between an axial point on the image side surface of the sixth lens and an inflection point on the image side surface of the sixth lens which is the fourth nearest to the optical axis. The following conditions are satisfied: $0.001 \text{ mm} \leq |HIF614| \leq 5$ mm; $0.001 \text{ mm} \leq |HIF624| \leq 5$ mm. Preferably, the following relations may be satisfied: $0.1 \text{ mm} \leq |HIF624| \leq 3.5$ mm and $0.1 \text{ mm} \leq |HIF614| \leq 3.5$ mm.

In the lens assembly 10 of the present invention, $(TH1+TH2)/HOI$ satisfies the following condition: $0 < (TH1+TH2)/HOI \leq 0.95$, or $0 < (TH1+TH2)/HOT \leq 0.5$ preferably. $(TH1+TH2)/HOS$ satisfies the following condition: $0 < (TH1+TH2)/HOS \leq 0.95$, or $0 < (TH1+TH2)/HOS \leq 0.5$ preferably. $2*(TH1+TH2)/PhiA$ satisfies the following condition: $0 < 2*(TH1+TH2)/PhiA \leq 0.95$, or $0 < 2*(TH1+TH2)/PhiA \leq 0.5$ preferably.

In an embodiment of the lens assembly 10 in the present invention, interchangeably arranging the lenses with a high dispersion coefficient and a low dispersion coefficient is beneficial to correcting the chromatic aberration of lens assembly 10.

The equation for the aspheric surface as mentioned above is:

$$z = ch2/[1+[1(k+1)c2h2]0.5] + A4h4 + A6h6 + A8h8 + A10h10 + A12h12 + A14h14 + A16h16 + A18h18 + A20h20 + \ldots \quad (1)$$

Wherein, z is a position value of the position along the optical axis at the height h where the surface apex is regarded as a reference; k is the conic coefficient; c is the reciprocal of curvature radius; and A4, A6, A8, A10, A12, A14, A16, A18, and A20 are high order aspheric coefficients.

In the lens assembly 10 of the present invention, the material of the lens may be made of glass or plastic. Using plastic as the material for producing the lens may effectively reduce the cost of manufacturing. In addition, using glass as the material for producing the lens may control the heat effect and increase the designed space configured by the refractive power of the optical image capturing module. Moreover, the object side surface and the image side surface from the first lens 11 to the sixth lens 17 may be aspheric, which may obtain more control variables. Apart from eliminating the aberration, the number of lenses used may be reduced compared with that of traditional lenses used made by glass. Thus, the total height of the lens assembly 10 may be reduced effectively.

Furthermore, in the lens assembly 10 of the present invention, when the surface of the lens is a convex surface, the surface of the lens adjacent to the optical axis is convex in principle. When the surface of the lens is a concave surface, the surface of the lens adjacent to the optical axis is concave in principle.

In the lens assembly 10 of the present invention, at least one of the first lens, the second lens, the third lens, the fourth lens, the fifth lens, and sixth lens may further be designed as a light filtration element with a wavelength of less than 500 nm depending on requirements. The light filtration element may be realized by coating at least one surface of the specific lens with the filter function, or may be realized by the lens itself having the material capable of filtering short wavelength.

The image plane of the lens assembly 10 of the present invention may be a plane or a curved surface depending requirements. When the image plane is a curved surface such as a spherical surface with a curvature radius, the incident angle necessary for focusing light on the image plane may be reduced. Hence, it not only contributes to shortening the length (TTL) of the optical image capturing module, but also promotes the relative illuminance.

The First Optical Embodiment

Figure 7:
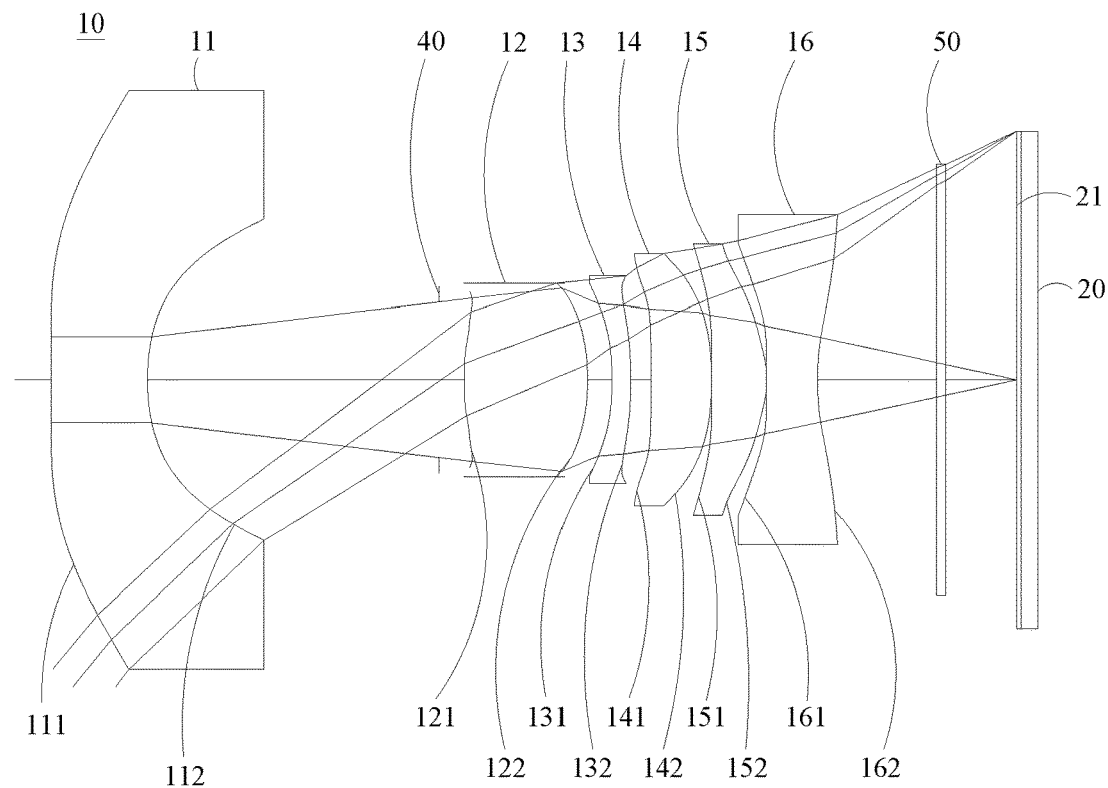
FIG. 7 depicts a configuration diagram of the lens assembly of the switchable image capturing system according to the first optical embodiment of the present invention.

As shown in FIG. 7, the lens assembly 10 includes six lenses with refractive power, which are a first lens 11, a second lens 21, a third lens 13, a four lens 14, a fifth lens 15, and a sixth lens 16.

Figure 8:
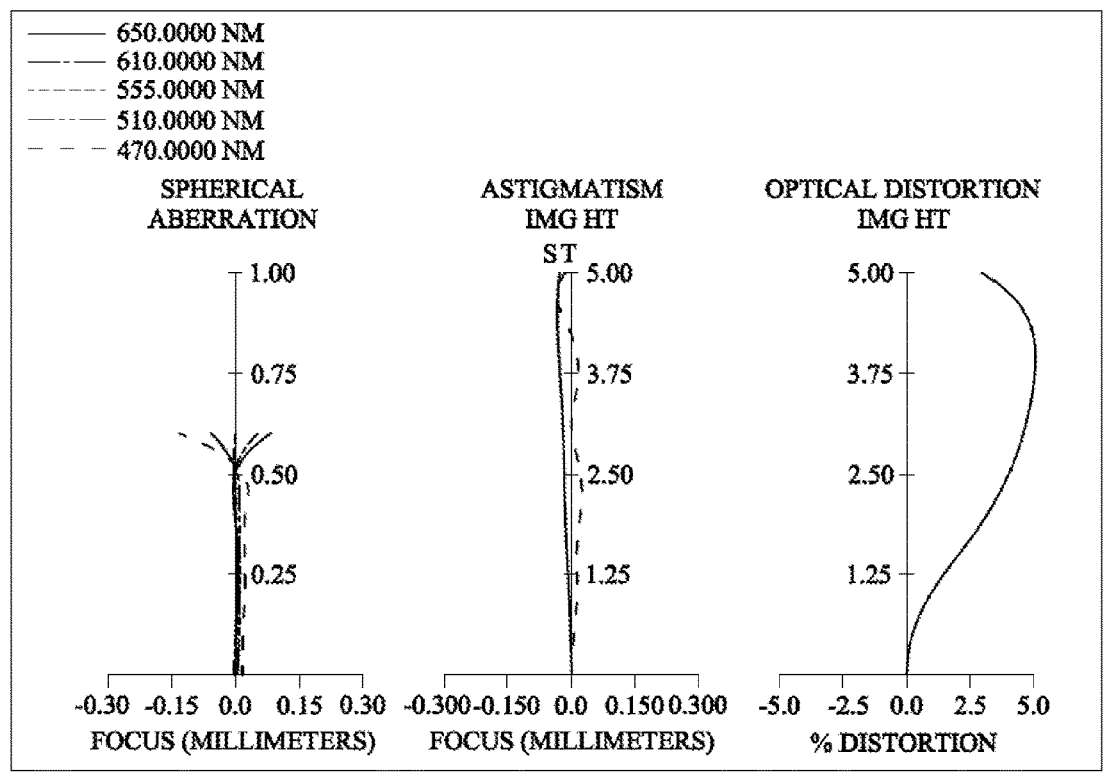
FIG. 8 depicts a curve diagram of the spherical aberration, astigmatism, and optical distortion illustrated sequentially from the left to the right according to the first optical embodiment of the present invention.

Please refer to FIG. 7 and FIG. 8. FIG. 7 depicts a configuration diagram of the lens assembly of the switchable image capturing system according to the first embodiment of the present invention. FIG. 8 is a curve diagram of the spherical aberration, astigmatism, and optical distortion illustrated sequentially from the left to the right according to the first optical embodiment of the present invention. As shown in FIG. 7, the switchable image capturing system includes a first lens 11, an aperture 40, a second lens 12, a third lens 13, a four lens 14, a fifth lens 15, a sixth lens 16, an IR-cut filter 50, an image plane 21, and image sensor elements 20 sequentially displayed from an object side to an image side.

The first lens 11 has negative refractive power and is made of a plastic material. The object side surface 111 thereof is a concave surface and the image side surface 112 thereof is a concave surface, both of which are aspheric. The object side surface 111 thereof has two inflection points. ARS11 denotes the arc length of the maximum effective half diameter of the object side surface 111 of the first lens 11. ARS12 denotes the arc length of the maximum effective half diameter of the image side surface 112 of the first lens 11. ARE11 denotes the arc length of half the entrance pupil diameter (HEP) of the object side surface 111 of the first lens 11. ARE12 denotes the arc length of half the entrance pupil diameter (HEP) of the image side surface 112 of the first lens 11. TP1 is the thickness of the first lens 11 on the optical axis.

SGI111 denotes a distance parallel to the optical axis from the inflection point on the object side surface 111 of the first lens 11 which is the nearest to the optical axis to an axial point on the object side surface 111 of the first lens 11. SGI121 denotes a distance parallel to an optical axis from an inflection point on the image side surface 112 of the first lens 11 which is the nearest to the optical axis to an axial point on the image side surface 112 of the first lens 11. The following conditions are satisfied: SGI111=−0.0031 mm; |SGI111|/(|SGI111|+TP1)=0.0016.

SGI112 denotes the distance parallel to the optical axis from the inflection point on the object side surface 111 of the first lens 11 which is the second nearest to the optical axis to an axial point on the object side surface 111 of the first lens 11. SGI122 denotes the distance parallel to an optical axis from an inflection point on the image side surface 112 of the first lens 11 which is the second nearest to the optical axis to an axial point on the image side surface 112 of the first lens 11. The following conditions are satisfied: SGI112=1.3178 mm; SGI112/(SGI112+TP1)=0.4052.

HIF111 denotes the distance perpendicular to the optical axis between the inflection point on the object side surface 111 of the first lens 11 which is the nearest to the optical axis and the optical axis. HIF121 denotes the distance perpendicular to the optical axis between an axial point on the image side surface 112 of the first lens 11 and an inflection point on the image side surface 112 of the first lens 11 which is the nearest to the optical axis. The following conditions are satisfied: HIF111=0.5557 mm; HIF111/HOI=0.1111.

HIF112 denotes the distance perpendicular to the optical axis between the inflection point on the object side surface 111 of the first lens 11 which is the second nearest to the optical axis and the optical axis. HIF122 denotes the distance perpendicular to the optical axis between an axial point on the image side surface 112 of the first lens 11 and an inflection point on the image side surface 112 of the first lens 11 which is the second nearest to the optical axis. The following conditions are satisfied: HIF112=5.3732 mm; HIF112/HOI=1.0746.

The second lens 12 has positive refractive power and is made of a plastic material. The object side surface 121 thereof is a convex surface and the image side surface 122 thereof is a convex surface, both of which are aspheric. The object side surface 121 thereof has an inflection point. ARS21 denotes the arc length of the maximum effective half diameter of the object side surface 121 of the second lens 12. ARS22 denotes the arc length of the maximum effective half diameter of the image side surface 122 of the second lens 12. ARE21 denotes an arc length of half the entrance pupil diameter (HEP) of the object side surface 121 of the second lens 12. ARE22 denotes the arc length of half the entrance pupil diameter (HEP) of the image side surface 122 of the second lens 12. TP2 is the thickness of the second lens 12 on the optical axis.

SGI211 denotes the distance parallel to the optical axis from the inflection point on the object side surface 121 of the second lens 12 which is the nearest to the optical axis to an axial point on the object side surface 121 of the second lens 12. SGI221 denotes the distance parallel to an optical axis from an inflection point on the image side surface 122 of the second lens 12 which is the nearest to the optical axis to an axial point on the image side surface 122 of the second lens 12. The following conditions are satisfied: SGI211=0.1069 mm; SGI211/(SGI211+TP2)=0.0412; SGI221=0 mm; SGI221/(SGI221+TP2)=0.

HIF211 denotes the distance perpendicular to the optical axis between the inflection point on the object side surface 121 of the second lens 12 which is the nearest to the optical axis and the optical axis. HIF221 denotes the distance perpendicular to the optical axis between an axial point on the image side surface 122 of the second lens 12 and an inflection point on the image side surface 122 of the second lens 12 which is the nearest to the optical axis. The following conditions are satisfied: HIF211=1.1264 mm; HIF211/HOI=0.2253; HIF221=0 mm; HIF221/HOI=0.

The third lens 13 has negative refractive power and is made of a plastic material. The object side surface 131 thereof is a concave surface and the image side surface 132 thereof is a convex surface, both of which are aspheric. The object side surface 131 and the image side surface 132 thereof both have an inflection point. ARS31 denotes the arc length of the maximum effective half diameter of the object side surface 131 of the third lens 13. ARS32 denotes an arc length of the maximum effective half diameter of the image side surface 132 of the third lens 13. ARE31 denotes the arc length of half the entrance pupil diameter (HEP) of the object side surface 131 of the third lens 13. ARE32 denotes the arc length of half the entrance pupil diameter (HEP) of the image side surface 132 of the third lens 13. TP3 is the thickness of the third lens 13 on the optical axis.

SGI311 denotes the distance parallel to the optical axis from the inflection point on the object side surface 131 of the third lens 13 which is the nearest to the optical axis to an axial point on the object side surface 131 of the third lens 13. SGI321 denotes the distance parallel to an optical axis from an inflection point on the image side surface 132 of the third lens 13 which is the nearest to the optical axis to an axial point on the image side surface 132 of the third lens 13. The following conditions are satisfied: SGI311=−0.3041 mm; |SGI311|/(|SGI311|+TP3)=0.4445; SGI321=−0.1172 mm; |SGI321|/(|SGI321|+TP3)=0.2357.

HIF311 denotes the distance perpendicular to the optical axis between the inflection point on the object side surface 131 of the third lens 13 which is the nearest to the optical axis and the optical axis. HIF321 denotes the distance perpendicular to the optical axis between an axial point on the image side surface 132 of the third lens 13 and an inflection point on the image side surface 132 of the third lens 13 which is the nearest to the optical axis. The following conditions are satisfied: HIF311=1.5907 mm; HIF311/HOI=0.3181; HIF321=1.3380 mm; HIF321/HOI=0.2676.

The fourth lens 14 has positive refractive power and is made of a plastic material. The object side surface 141 thereof is a convex surface and the image side surface 142 thereof is a concave surface, both of which are aspheric. The object side surface 141 thereof has two inflection points and the image side surface 142 thereof has an inflection point. ARS41 denotes the arc length of the maximum effective half diameter of the object side surface 141 of the fourth lens 14. ARS42 denotes the arc length of the maximum effective half diameter of the image side surface 142 of the fourth lens 14. ARE41 denotes the arc length of half the entrance pupil diameter (HEP) of the object side surface 141 of the fourth lens 14. ARE42 denotes the arc length of half the entrance pupil diameter (HEP) of the image side surface 142 of the fourth lens 14. TP4 is the thickness of the fourth lens 14 on the optical axis.

SGI411 denotes the distance parallel to the optical axis from the inflection point on the object side surface 141 of the fourth lens 14 which is the nearest to the optical axis to an axial point on the object side surface 141 of the fourth lens 14. SGI421 denotes the distance parallel to an optical axis from an inflection point on the image side surface 142 of the fourth lens 14 which is the nearest to the optical axis to an axial point on the image side surface 142 of the fourth lens 14. The following conditions are satisfied: SGI411=0.0070 mm; |SGI411|/(|SGI411|+TP4)=0.0056; SGI421=0.0006 mm; |SGI421|/(|SGI421|+TP4)=0.0005.

SGI412 denotes the distance parallel to the optical axis from the inflection point on the object side surface 141 of the fourth lens 14 which is the second nearest to the optical axis to an axial point on the object side surface 141 of the fourth lens 14. SGI422 denotes the distance parallel to an optical axis from an inflection point on the image side surface 142 of the fourth lens 14 which is the second nearest to the optical axis to an axial point on the image side surface 142 of the fourth lens 14. The following conditions are satisfied: SGI412=−0.2078 mm; |SGI412|/(|SGI412|+TP4)=0.1439.

HIF411 denotes the distance perpendicular to the optical axis between the inflection point on the object side surface 141 of the fourth lens 14 which is the nearest to the optical axis and the optical axis. HIF421 denotes the distance perpendicular to the optical axis between an axial point on the image side surface 142 of the fourth lens 14 and an inflection point on the image side surface 142 of the fourth lens 14 which is the nearest to the optical axis. The following conditions are satisfied: HIF411=0.4706 mm; HIF411/HOI=0.0941; HIF421=0.1721 mm; HIF421/HOI=0.0344.

HIF412 denotes the distance perpendicular to the optical axis between the inflection point on the object side surface 141 of the fourth lens 14 which is the second nearest to the optical axis and the optical axis. HIF422 denotes the distance perpendicular to the optical axis between an axial point on the image side surface 142 of the fourth lens 14 and an inflection point on the image side surface 142 of the fourth lens 14 which is the second nearest to the optical axis. The following conditions are satisfied: HIF412=2.0421 mm; HIF412/HOI=0.4084.

The fifth lens 15 has positive refractive power and is made of a plastic material. The object side surface 151 thereof is a convex surface and the image side surface 152 thereof is a convex surface, both of which are aspheric. The object side surface 151 thereof has two inflection points and the image side surface 152 thereof has an inflection point. ARS51 denotes the arc length of the maximum effective half diameter of the object side surface 151 of the fifth lens 15. ARS52 denotes the arc length of the maximum effective half diameter of the image side surface 152 of the fifth lens 15. ARE51 denotes the arc length of half the entrance pupil diameter (HEP) of the object side surface 151 of the fifth lens 15. ARE52 denotes the arc length of half the entrance pupil diameter (HEP) of the image side surface 152 of the fifth lens 15. TP5 is the thickness of the fifth lens 15 on the optical axis.

SGI511 denotes the distance parallel to the optical axis from the inflection point on the object side surface 151 of the fifth lens 15 which is the nearest to the optical axis to an axial point on the object side surface 151 of the fifth lens 15. SGI521 denotes the distance parallel to an optical axis from an inflection point on the image side surface 152 of the fifth lens 15 which is the nearest to the optical axis to an axial point on the image side surface 152 of the fifth lens 15. The following conditions are satisfied: SGI511=0.00364 mm;

|SGI511|/(|SGI511|+TP5)=0.00338; SGI521=−0.63365 mm; |SGI521|/(|SGI521|+TP5)=0.37154.

SGI512 denotes the distance parallel to the optical axis from the inflection point on the object side surface 151 of the fifth lens 15 which is the second nearest to the optical axis to an axial point on the object side surface 151 of the fifth lens 15. SGI522 denotes the distance parallel to an optical axis from an inflection point on the image side surface 152 of the fifth lens 15 which is the second nearest to the optical axis to an axial point on the image side surface 152 of the fifth lens 15. The following conditions are satisfied: SGI512=−0.32032 mm; |SGI512|/(|SGI512|+TP5)=0.23009.

SGI513 denotes the distance parallel to the optical axis from the inflection point on the object side surface 151 of the fifth lens 15 which is the third nearest to the optical axis to an axial point on the object side surface 151 of the fifth lens 15. SGI523 denotes the distance parallel to an optical axis from an inflection point on the image side surface 152 of the fifth lens 15 which is the third nearest to the optical axis to an axial point on the image side surface 152 of the fifth lens 15. The following conditions are satisfied: SGI513=0 mm; |SGI513|/(|SGI513|+TP5)=0; SGI523=0 mm; |SGI523|/(|SGI523|+TP5)=0.

SGI514 denotes the distance parallel to the optical axis from the inflection point on the object side surface 151 of the fifth lens 15 which is the fourth nearest to the optical axis to an axial point on the object side surface 151 of the fifth lens 15. SGI524 denotes a distance parallel to an optical axis from an inflection point on the image side surface 152 of the fifth lens 15 which is the fourth nearest to the optical axis to an axial point on the image side surface 152 of the fifth lens 15. The following conditions are satisfied: SGI514=0 mm; |SGI514|/(|SGI514|+TP5)=0; SGI524=0 mm; |SGI524|/(|SGI524|+TP5)=0.

HIF511 denotes the distance perpendicular to the optical axis between the inflection point on the object side surface 151 of the fifth lens 15 which is the nearest to the optical axis and the optical axis. HIF521 denotes the distance perpendicular to the optical axis between the optical axis and an inflection point on the image side surface 152 of the fifth lens 15 which is the nearest to the optical axis. The following conditions are satisfied: HIF511=0.28212 mm; HIF511/HOI=0.05642; HIF521=2.13850 mm; HIF521/HOI=0.42770.

HIF512 denotes the distance perpendicular to the optical axis between the inflection point on the object side surface 151 of the fifth lens 15 which is the second nearest to the optical axis and the optical axis. HIF522 denotes the distance perpendicular to the optical axis between the optical axis and an inflection point on the image side surface 152 of the fifth lens 15 which is the second nearest to the optical axis. The following conditions are satisfied: HIF512=2.51384 mm; HIF512/HOI=0.50277.

HIF513 denotes the distance perpendicular to the optical axis between the inflection point on the object side surface 151 of the fifth lens 15 which is the third nearest to the optical axis and the optical axis. HIF523 denotes the distance perpendicular to the optical axis between the optical axis and an inflection point on the image side surface 152 of the fifth lens 15 which is the third nearest to the optical axis. The following conditions are satisfied: HHIF513=0 mm; HIF513/HOI=0; HIF523=0 mm; HIF523/HOI=0.

HIF514 denotes the distance perpendicular to the optical axis between the inflection point on the object side surface 151 of the fifth lens 15 which is the fourth nearest to the optical axis and the optical axis. HIF524 denotes the distance perpendicular to the optical axis between the optical axis and an inflection point on the image side surface 152 of the fifth lens 15 which is the fourth nearest to the optical axis. The following conditions are satisfied: HIF514=0 mm; HIF514/HOI=0; HIF524=0 mm; HIF524/HOI=0.

The sixth lens 16 has negative refractive power and is made of a plastic material. The object side surface 161 thereof is a concave surface and the image side surface 162 thereof is a concave surface. The object side surface 161 has two inflection points and the image side surface 162 thereof has an inflection point. Therefore, it may be effective to adjust the angle at which each field of view is incident on the sixth lens 16 to improve the aberration. ARS61 denotes the arc length of the maximum effective half diameter of the object side surface 161 of the sixth lens 16. ARS62 denotes the arc length of the maximum effective half diameter of the image side surface 162 of the sixth lens 16. ARE61 denotes the arc length of half the entrance pupil diameter (HEP) of the object side surface 161 of the sixth lens 16. ARE62 denotes the arc length of half the entrance pupil diameter (HEP) of the image side surface 162 of the sixth lens 16. TP6 is the thickness of the sixth lens 16 on the optical axis.

SGI611 denotes the distance parallel to the optical axis from the inflection point on the object side surface 161 of the sixth lens 16 which is the nearest to the optical axis to an axial point on the object side surface 161 of the sixth lens 16. SGI621 denotes the distance parallel to an optical axis from an inflection point on the image side surface 162 of the sixth lens 16 which is the nearest to the optical axis to an axial point on the image side surface 162 of the sixth lens 16. The following conditions are satisfied: SGI611=−0.38558 mm; |SGI611|/(|SGI611|+TP6)=0.27212; SGI621=0.12386 mm; |SGI621|/(|SGI621|+TP6)=0.10722.

SGI612 denotes the distance parallel to the optical axis from the inflection point on the object side surface 161 of the sixth lens 16 which is the second nearest to the optical axis to an axial point on the object side surface 161 of the sixth lens 16. SGI621 denotes the distance parallel to an optical axis from an inflection point on the image side surface 162 of the sixth lens 16 which is the second nearest to the optical axis to an axial point on the image side surface 162 of the sixth lens 16. The following conditions are satisfied: SGI612=−0.47400 mm; |SGI612|/(|SGI612|+TP6)=0.31488; SGI622=0 mm; |SGI622|/(|SGI622|+TP6)=0.

HIF611 denotes the distance perpendicular to the optical axis between the inflection point on the object side surface 161 of the sixth lens 16 which is the nearest to the optical axis and the optical axis. HIF621 denotes the distance perpendicular to the optical axis between the inflection point on the image side surface 162 of the sixth lens 16 which is the nearest to the optical axis and the optical axis. The following conditions are satisfied: HIF611=2.24283 mm; IF611/HOI=0.44857; HIF621=1.07376 mm; HIF621/HOI=0.21475.

HIF612 denotes the distance perpendicular to the optical axis between the inflection point on the object side surface 161 of the sixth lens 16 which is the second nearest to the optical axis and the optical axis. HIF622 denotes the distance perpendicular to the optical axis between the inflection point on the image side surface 162 of the sixth lens 16 which is the second nearest to the optical axis and the optical axis. The following conditions are satisfied: HIF611=2.24283 mm; HIF612=2.48895 mm; HIF612/HOI=0.49779.

HIF613 denotes the distance perpendicular to the optical axis between the inflection point on the object side surface 161 of the sixth lens 16 which is the third nearest to the optical axis and the optical axis. HIF623 denotes the distance perpendicular to the optical axis between the inflection point on the image side surface 162 of the sixth lens 16 which is the third nearest to the optical axis and the optical axis. The following conditions are satisfied: HIF613=0 mm; HIF613/HOI=0; HIF623=0 mm; HIF623/HOI=0.

HIF614 denotes the distance perpendicular to the optical axis between the inflection point on the object side surface 161 of the sixth lens 16 which is the fourth nearest to the optical axis and the optical axis. HIF624 denotes the distance perpendicular to the optical axis between the inflection point on the image side surface 162 of the sixth lens 16 which is the fourth nearest to the optical axis and the optical axis. The following conditions are satisfied: HIF614=0 mm; HIF614/HOI=0; HIF624=0 mm; HIF624/HOI=0.

The IR-cut filter 50 is made of glass and is disposed between the sixth lens 16 and the image plane 21, which does not affect the focal length of the optical image capturing module.

In the lens assembly 10 of the embodiment, f is the focal length of the lens assembly 10. HEP is the entrance pupil diameter of the lens assembly 10. HAF is half of the maximum view angle of the lens assembly 10. The detailed parameters are shown as below: f=4.075 mm, f/HEP=1.4, HAF=50.001°, and tan(HAF)=1.1918.

In the lens assembly 10 of the embodiment, f1 is the focal length of the first lens assembly 11. f6 is a focal length of the sixth lens assembly 16. The following conditions are satisfied: f1=−7.828 mm; |f/f1|=0.52060; f6=−4.886; and |f1|>|f6|.

In the lens assembly 10 of the embodiment, the focal lengths of the second lens 12 to the fifth lens 15 are f2, f3, f4, and f5, respectively. The following conditions are satisfied: |f2|+|f3|+|f4|+|f5|=95.50815 mm; |f1|+|f6|=12.71352 mm and |f2|+|f3|+|f4|+|f5|>|f1|+|f6|.

PPR is the ratio of the focal length f of the lens assembly 10 to a focal length fp of each of lenses with positive refractive power. NPR is the ratio of the focal length f of the lens assembly 10 to a focal length fn of each of lenses with negative refractive power. In the lens assembly 10 of the embodiment, The sum of the PPR of all lenses with positive refractive power is ΣPPR=f/f2+f/f4+f/f5=1.63290. The sum of the NPR of all lenses with negative refractive power is ΣNPR=|f/f1|+|f/f3|+|f/f6|=1.51305, and ΣPPR/|ΣNPR|=1.07921. The following conditions are also satisfied: |f/f2|=0.69101; |f/f3|=0.15834; |f/f4|=0.06883; |f/f5|=0.87305; |f/f6|=0.83412.

In the switchable image capturing system of the embodiment, InTL is the distance on the optical axis from an object side surface 111 of the first lens 11 to an image side surface 162 of the sixth lens 16. HOS is the distance on the optical axis from an object side surface 111 of the first lens 11 to the image plane 21. InS is a distance from the aperture 40 to the image plane 21. HOI is defined as half the diagonal of the sensing field of the image sensor elements 20. BFL is the distance from the image side surface 162 of the sixth lens 16 and the image plane 21. The following conditions are satisfied: InTL+BFL=HOS; HOS=19.54120 mm; HOI=5.0 mm; HOS/HOI=3.90824; HOS/f=4.7952; InS=11.685 mm; and InS/HOS=0.59794.

In the lens assembly 10 of the embodiment, ΣTP is the sum of the thicknesses of all the lenses with refractive power on the optical axis. The following condition is satisfied: ΣTP=8.13899 mm, ΣTP/InTL=0.52477, and InTL/HOS=0.917102. Therefore, the contrast ratio of system imaging and the yield rate of lens manufacturing may be attended simultaneously. Moreover, an appropriate back focal length is provided to accommodate other elements.

In the lens assembly 10 of the embodiment, R1 is the curvature radius of the object side surface 111 of the first lens 11. R2 is the curvature radius of the image side surface 112 of the first lens 11. The following condition is satisfied: |R1/R2|=8.99987. Therefore, the first lens 11 is equipped with appropriate intensity of positive refractive power to prevent the spherical aberration from increasing too fast.

In the lens assembly 10 of the embodiment, R11 is the curvature radius of the object side surface 161 of the sixth lens 16. R12 is the curvature radius of the image side surface 162 of the sixth lens 16. This following condition is satisfied: (R11−R12)/(R11+R12)=1.27780. Therefore, it is advantageous to correct the astigmatism generated by the lens assembly 10.

In the lens assembly 10 of the embodiment, ΣPP is the sum of the focal lengths of all lenses with positive refractive power. The following conditions are satisfied: ΣPP=f2+f4+f5=69.770 mm and f5/(f2+f4+f5)=0.067. Therefore, it is beneficial to properly distribute the positive refractive power of a single lens to other positive lenses to suppress the generation of significant aberrations during the traveling of incident light.

In the lens assembly 10 of the embodiment, ΣNP is the sum of the focal lengths of all lenses with negative refractive power. The following conditions are satisfied: ΣNP=f1+f3+f6=−38.451 mm and f6/(f1+f3+f6)=0.127. Therefore, it is beneficial to properly distribute the negative refractive power of the sixth lens 16 to other negative lenses to suppress the generation of significant aberrations during the traveling of incident light.

In the lens assembly 10 of the embodiment, IN12 is the distance between the first lens 11 and the second lens 12 on the optical axis. The following condition is satisfied: IN12=6.418 mm; IN12/f=1.57491. Therefore, it is beneficial to improve the chromatic aberration of the lenses so as to enhance the performance.

In the lens assembly 10 of the embodiment, IN56 is a distance between the fifth lens 15 and the sixth lens 16 on the optical axis. The following condition is satisfied: IN56=0.025 mm; IN56/f=0.00613. Therefore, it is beneficial to improve the chromatic aberration of the lenses so as to enhance the performance.

In the lens assembly 10 of the embodiment, TP1 and TP2 are respectively the thicknesses of the first lens 11 and the second lens 12 on the optical axis. The following condition is satisfied: TP1=1.934 mm; TP2=2.486 mm; and (TP1+IN12)/TP2=3.36005. Therefore, it is beneficial to control the sensitivity produced by the lens assembly 10 so as to enhance the performance.

In the lens assembly 10 of the embodiment, TP5 and TP6 are respectively the thicknesses of the fifth lens 15 and the sixth lens 16 on the optical axis. IN56 is a distance between the two lenses on the optical axis. The following conditions are satisfied: TP5=1.072 mm; TP6=1.031 mm; (TP6+IN56)/TP5=0.98555. Therefore, it is beneficial to control the sensitivity produced by the optical image capturing module so as to enhance the performance.

In the lens assembly 10 of the embodiment, IN34 is a distance between the third lens 13 and the fourth lens 14 on the optical axis. IN45 is a distance between the fourth lens 14 and the fifth lens 15 on the optical axis. The following conditions are satisfied: IN34=0.401 mm; IN45=0.025 mm; and TP4/(IN34+TP4+IN45)=0.74376. Therefore, it is beneficial to slightly correct the aberration generated by the incident light advancing in the process layer upon layer so as to decrease the overall height of the system.

In the lens assembly 10 of the embodiment, InRS51 is the horizontal distance parallel to an optical axis from a maximum effective half diameter position to an axial point on the object side surface 151 of the fifth lens 15. InRS52 is the horizontal distance parallel to an optical axis from a maximum effective half diameter position to an axial point on the image side surface 152 of the fifth lens 15. TP5 is the thickness of the fifth lens 15 on the optical axis. The following condition is satisfied: InRS51=−0.34789 mm; InRS52=−0.88185 mm; |InRS51|/TP5=0.32458 and |InRS52|/TP5=0.82276. Therefore, it is advantageous for the lens to be manufactured and formed so as to maintain minimization.

In the lens assembly 10 of the embodiment, HVT51 is the distance perpendicular to the optical axis between a critical point on an object side surface 151 of the fifth lens 15 and the optical axis. HVT52 is the distance perpendicular to the optical axis between a critical point on an image side surface 152 of the fifth lens 15 and the optical axis. The following conditions are satisfied: HVT51=0.515349 mm; HVT52=0 mm.

In the lens assembly 10 of the embodiment, InRS61 is the horizontal distance parallel to an optical axis from a maximum effective half diameter position to an axial point on the object side surface 161 of the sixth lens 16. InRS62 is the horizontal distance parallel to an optical axis from a maximum effective half diameter position to an axial point on the image side surface 162 of the sixth lens 16. TP6 is the thickness of the sixth lens 16 on the optical axis. The following conditions are satisfied: InRS61=−0.58390 mm; InRS62=0.41976 mm; |InRS61|/TP6=0.56616 and |InRS62|/TP6=0.40700. Therefore, it is advantageous for the lens to be manufactured and formed so as to maintain minimization.

In the lens assembly 10 of the embodiment, HVT61 is the distance perpendicular to the optical axis between a critical point on an object side surface 161 of the sixth lens 16 and the optical axis. HVT62 is the distance perpendicular to the optical axis between a critical point on an image side surface 162 of the sixth lens 16 and the optical axis. The following conditions are satisfied: HVT61=0 mm; HVT62=0 mm.

In the lens assembly 10 of the embodiment, the following conditions are satisfied: HVT51/HOI=0.1031. Therefore, it is beneficial to correct the aberration of the surrounding view field of the switchable image capturing system.

In the lens assembly 10 of the embodiment, the following conditions are satisfied: HVT51/HOS=0.02634. Therefore, it is beneficial to correct the aberration of the surrounding view field of the switchable image capturing system.

In the lens assembly 10 of the embodiment, the second lens 12, the third lens 13, and the sixth lens 16 have negative refractive power. A dispersion coefficient of the second lens 12 is NA2. A dispersion coefficient of the third lens 13 is NA3. A dispersion coefficient of the sixth lens 16 is NA6. The following condition is satisfied: NA6/NA2≤1. Therefore, it is beneficial to correct the aberration of the lens assembly 10.

In the switchable image capturing system of the embodiment, TDT refers to TV distortion when an image is formed. ODT refers to optical distortion when an image is formed. The following conditions are satisfied: TDT=2.124%; ODT=5.076%.

In the lens assembly 10 of the embodiment, LS is 12 mm. PhiA is 2*EHD62=6.726 mm (EHD62: the maximum effective half diameter of the image side 162 of the sixth lens 16). PhiC=PhiA+2*TH2=7.026 mm; PhiD=PhiC+2*(TH1+TH2)=7.426 mm; TH1 is 0.2 mm; TH2 is 0.15 mm; PhiA/PhiD is 0.9057; TH1+TH2 is 0.35 mm; (TH1+TH2)/HOI is 0.035; (TH1+TH2)/HOS is 0.0179; 2*(TH1+TH2)/PhiA is 0.1041; (TH1+TH2)/LS is 0.0292.

Please refer to Table 1 and Table 2 in the following.

TABLE 1

Data of the optical image capturing module of the first optical embodiment
f = 4.075 mm; f/HEP = 1.4; HAF = 50.000 deg

| Surface | | Curvature Radius | Thickness (mm) | Material |
|---|---|---|---|---|
| 0 | Object | Plano | Plano | |
| 1 | Lens 1 | −40.99625704 | 1.934 | Plastic |
| 2 | | 4.555209289 | 5.923 | |
| 3 | Aperture | Plano | 0.495 | |
| 4 | Lens 2 | 5.333427366 | 2.486 | Plastic |
| 5 | | −6.781659971 | 0.502 | |
| 6 | Lens 3 | −5.697794287 | 0.380 | Plastic |
| 7 | | −8.883957518 | 0.401 | |
| 8 | Lens 4 | 13.19225664 | 1.236 | Plastic |
| 9 | | 21.55681832 | 0.025 | |
| 10 | Lens 5 | 8.987806345 | 1.072 | Plastic |
| 11 | | −3.158875374 | 0.025 | |
| 12 | Lens 6 | −29.46491425 | 1.031 | Plastic |
| 13 | | 3.593484273 | 2.412 | |
| 14 | IR-cut filter | Plano | 0.200 | |
| 15 | | Plano | 1.420 | |
| 16 | Image plane | Plano | | |

| Surface | Refractive index | Dispersion coefficient | Focal length |
|---|---|---|---|
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |
| 14 | 1.517 | 64.13 | |
| 15 | | | |
| 16 | | | |

Reference wavelength = 555 nm; Shield position: The clear aperture of the first surface is 5.800 mm. The clear aperture of the third surface is 1.570 mm.
The clear aperture of the fifth surface is 1.950 mm.

TABLE 2

The aspheric surface parameters of the first optical embodiment
Table 2. Aspheric Coefficients

| | Surface | | | |
|---|---|---|---|---|
| | 1 | 2 | 4 | 5 |
| k | 4.310876E+01 | −4.707622E+00 | 2.616025E+00 | 2.445397E+00 |
| A4 | 7.054243E−03 | 1.714312E−02 | −8.377541E−03 | −1.789549E−02 |

TABLE 2-continued

The aspheric surface parameters of the first optical embodiment
Table 2. Aspheric Coefficients

| | | | | |
|---|---|---|---|---|
| A6  | −5.233264E−04 | −1.502232E−04 | −1.838068E−03 | −3.657520E−03 |
| A8  | 3.077890E−05  | −1.359611E−04 | 1.233332E−03  | −1.131622E−03 |
| A10 | −1.260650E−06 | 2.680747E−05  | −2.390895E−03 | 1.390351E−03  |
| A12 | 3.319093E−08  | −2.017491E−06 | 1.998555E−03  | −4.152857E−04 |
| A14 | −5.051600E−10 | 6.604615E−08  | −9.734019E−04 | 5.487286E−05  |
| A16 | 3.380000E−12  | −1.301630E−09 | 2.478373E−04  | −2.919339E−06 |

| | Surface | | | |
|---|---|---|---|---|
| | 6 | 7 | 8 | 9 |
| k   | 5.645686E+00  | −2.117147E+01 | −5.287220E+00 | 6.200000E+01  |
| A4  | −3.379055E−03 | −1.370959E−02 | −2.937377E−02 | −1.359965E−01 |
| A6  | −1.225453E−03 | 6.250200E−03  | 2.743532E−03  | 6.628518E−02  |
| A8  | −5.979572E−03 | −5.854426E−03 | −2.457574E−03 | −2.129167E−02 |
| A10 | 4.556449E−03  | 4.049451E−03  | 1.874319E−03  | 4.396344E−03  |
| A12 | −1.177175E−03 | −1.314592E−03 | −6.013661E−04 | −5.542899E−04 |
| A14 | 1.370522E−04  | 2.143097E−04  | 8.792480E−05  | 3.768879E−05  |
| A16 | −5.974015E−06 | −1.399894E−05 | −4.770527E−06 | −1.052467E−06 |

| | Surface | | | |
|---|---|---|---|---|
| | 10 | 11 | 12 | 13 |
| k   | −2.114008E+01 | −7.699904E+00 | −6.155476E+01 | −3.120467E−01 |
| A4  | −1.263831E−01 | −1.927804E−02 | −2.492467E−02 | −3.521844E−02 |
| A6  | 6.965399E−02  | 2.478376E−03  | −1.835360E−03 | 5.629654E−03  |
| A8  | −2.116027E−02 | 1.438785E−03  | 3.201343E−03  | −5.466925E−04 |
| A10 | 3.819371E−03  | −7.013749E−04 | −8.990757E−04 | 2.231154E−05  |
| A12 | −4.040283E−04 | 1.253214E−04  | 1.245343E−04  | 5.548990E−07  |
| A14 | 2.280473E−05  | −9.943196E−06 | −8.788363E−06 | −9.396920E−08 |
| A16 | −5.165452E−07 | 2.898397E−07  | 2.494302E−07  | 2.728360E−09  |

The values related to arc lengths may be obtained according to table 1 and table 2.

First optical embodiment (Reference wavelength = 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 1.455 | 1.455 | −0.00033 | 99.98%  | 1.934 | 75.23%  |
| 12 | 1.455 | 1.495 | 0.03957  | 102.72% | 1.934 | 77.29%  |
| 21 | 1.455 | 1.465 | 0.00940  | 100.65% | 2.486 | 58.93%  |
| 22 | 1.455 | 1.495 | 0.03950  | 102.71% | 2.486 | 60.14%  |
| 31 | 1.455 | 1.486 | 0.03045  | 102.09% | 0.380 | 391.02% |
| 32 | 1.455 | 1.464 | 0.00830  | 100.57% | 0.380 | 385.19% |
| 41 | 1.455 | 1.458 | 0.00237  | 100.16% | 1.236 | 117.95% |
| 42 | 1.455 | 1.484 | 0.02825  | 101.94% | 1.236 | 120.04% |
| 51 | 1.455 | 1.462 | 0.00672  | 100.46% | 1.072 | 136.42% |
| 52 | 1.455 | 1.499 | 0.04335  | 102.98% | 1.072 | 139.83% |
| 61 | 1.455 | 1.465 | 0.00964  | 100.66% | 1.031 | 142.06% |
| 62 | 1.455 | 1.469 | 0.01374  | 100.94% | 1.031 | 142.45% |

| ARS | EHD | ARS value | ARS − EHD | (ARS/EHD)% | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35%  |
| 22 | 1.950 | 2.119 | 0.169 | 108.65% | 2.486 | 85.23%  |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first optical embodiment, wherein the unit of the curvature radius, the thickness, the distance, and the focal length is millimeters (mm). Surfaces 0-16 illustrate the surfaces from the object side to the image side. Table 2 is the aspheric coefficients of the first optical embodiment, wherein k is the conic coefficient in the aspheric surface formula. A1-A20 are aspheric surface coefficients from the first to the twentieth orders for each surface. In addition, the tables for each of the embodiments as follows correspond to the schematic views and the aberration graphs for each of the embodiments. The definitions of data in the tables are the same as those in Table 1 and Table 2 for the first optical embodiment. Therefore, similar description shall not be illustrated again. Furthermore, the definitions of element parameters in each of the embodiments are the same as those in the first optical embodiment.

The Second Optical Embodiment

Figure 9:
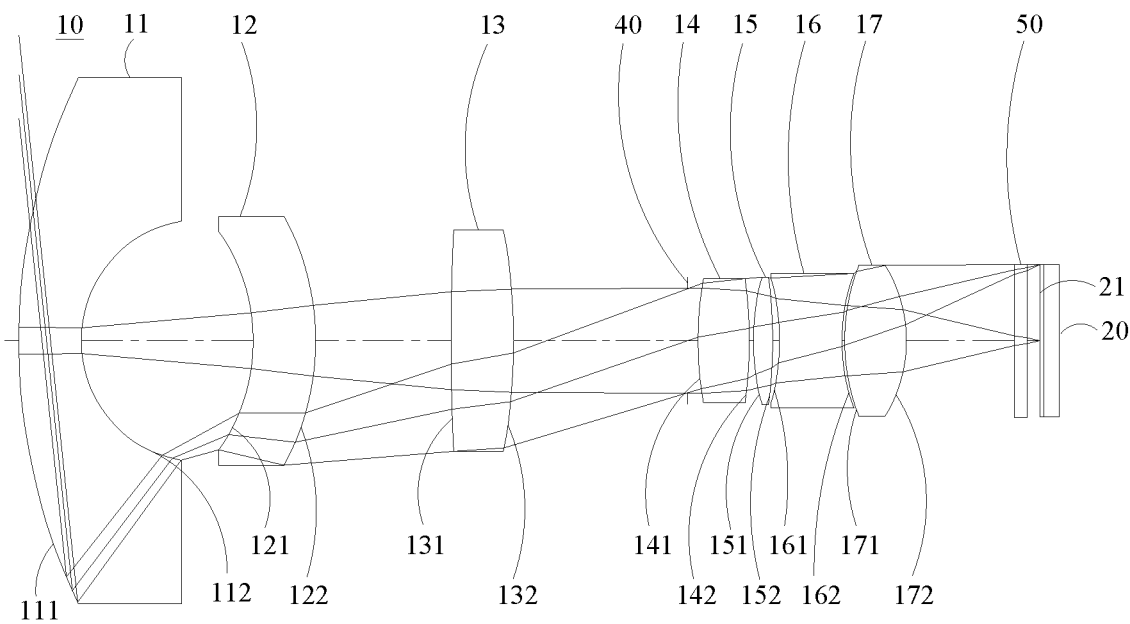
FIG. 9 depicts a configuration diagram of the lens assembly of the switchable image capturing system according to the second optical embodiment of the present invention.

As shown in FIG. 9, the lens assembly 10 may include seven lenses with refractive power, which are a first lens 11, a second lens 12, a third lens 13, a four lens 14, a fifth lens 15, a sixth lens 16, and a seventh lens 17 sequentially displayed from an object side surface to an image side surface.

Figure 10:
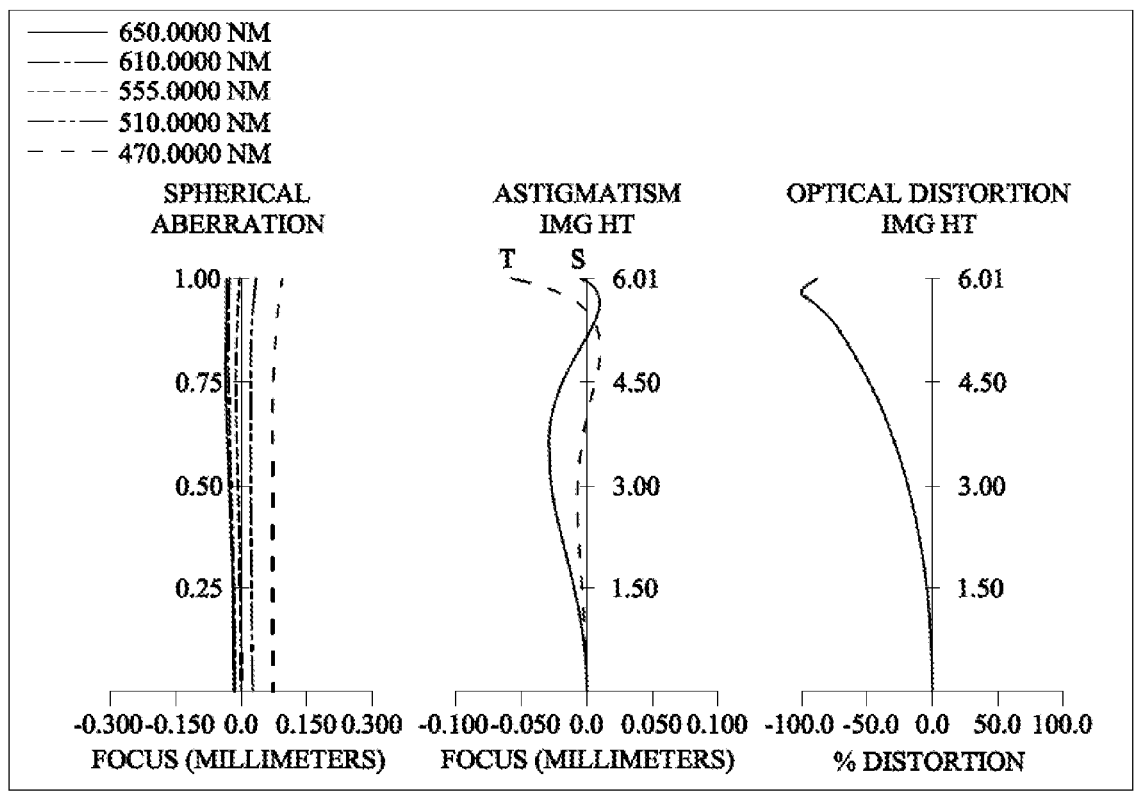
FIG. 10 depicts a curve diagram of the spherical aberration, astigmatism, and optical distortion illustrated sequentially from the left to the right according to the second optical embodiment of the present invention.

Please refer to FIG. 9 and FIG. 10. FIG. 9 depicts a configuration diagram of the lens assembly of the switchable image capturing system according to the second optical embodiment of the present invention. FIG. 10 depicts a curve diagram of the spherical aberration, astigmatism, and optical distortion illustrated sequentially from the left to the right according to the second optical embodiment of the present invention. As shown in FIG. 9, the switchable image capturing system includes a first lens 11, a second lens 12, a third lens 13, an aperture 40, a four lens 14, a fifth lens 15, a sixth lens 16, a seventh lens 17, an IR-cut filter 50, an image plane 21, and image sensor elements 20 sequentially displayed from an object side to an image side.

The first lens 11 has negative refractive power and is made of a glass material. The object side surface 111 thereof is a convex surface and the image side surface 112 thereof is a concave surface.

The second lens 12 has negative refractive power and is made of a glass material. The object side surface thereof 121 is a concave surface and the image side surface thereof 122 is a convex surface.

The third lens 13 has positive refractive power and is made of a glass material. The object side surface 131 thereof is a convex surface and the image side surface 132 thereof is a convex surface.

The fourth lens 14 has positive refractive power and is made of a glass material. The object side surface 141 thereof is a convex surface and the image side surface 142 thereof is a convex surface.

The fifth lens 15 has positive refractive power and is made of a glass material. The object side surface 151 thereof is a convex surface and the image side surface 152 thereof is a convex surface.

The sixth lens 16 has negative refractive power and is made of a glass material. The object side surface 161 thereof is a concave surface and the image side surface 162 thereof is a concave surface. Therefore, it may be effective to adjust the angle at which each field of view is incident on the sixth lens 16 to improve the aberration.

The seventh lens 17 has negative refractive power and is made of a glass material. The object side surface 171 thereof is a convex surface and the image side surface 172 thereof is a convex surface. Therefore, it is advantageous for the lens to reduce the back focal length to maintain minimization. In addition, it is effective to suppress the incident angle with incoming light from an off-axis view field and further correct the aberration in the off-axis view field.

The IR-cut filter 50 is made of glass and is disposed between the seventh lens 17 and the image plane 21, which does not affect the focal length of the optical image capturing module.

Please refer to the following Table 3 and Table 4.

TABLE 3

Data of the optical image capturing module of the second optical embodiment
f = 4.7601 mm; f/HEP = 2.2; HAF = 95.98 deg

| Surface | | Curvature Radius | Thickness(mm) | Material |
|---|---|---|---|---|
| 0 | Object | 1E+18 | 1E+18 | |
| 1 | Lens 1 | 47.71478323 | 4.977 | Glass |
| 2 | | 9.527614761 | 13.737 | |
| 3 | Lens 2 | −14.88061107 | 5.000 | Glass |
| 4 | | −20.42046946 | 10.837 | |
| 5 | Lens 3 | 182.4762997 | 5.000 | Glass |
| 6 | | −46.71963608 | 13.902 | |
| 7 | Aperture | 1E+18 | 0.850 | |
| 8 | Lens 4 | 28.60018103 | 4.095 | Glass |
| 9 | | −35.08507586 | 0.323 | |
| 10 | Lens 5 | 18.25991342 | 1.539 | Glass |
| 11 | | −36.99028878 | 0.546 | |
| 12 | Lens 6 | −18.24574524 | 5.000 | Glass |
| 13 | | 15.33897192 | 0.215 | |
| 14 | Lens 7 | 16.13218937 | 4.933 | Glass |
| 15 | | −11.24007 | 8.664 | |
| 16 | IR-cut filter | 1E+18 | 1.000 | BK_7 |
| 17 | | 1E+18 | 1.007 | |
| 18 | Image plane | 1E+18 | −0.007 | |

TABLE 3-continued

Data of the optical image capturing module of the second optical embodiment
f = 4.7601 mm; f/HEP = 2.2; HAF = 95.98 deg

| Surface | Refractive index | Dispersion coefficient | Focal length |
|---|---|---|---|
| 0 | | | |
| 1 | 2.001 | 29.13 | −12.647 |
| 2 | | | |
| 3 | 2.001 | 29.13 | −99.541 |
| 4 | | | |
| 5 | 1.847 | 23.78 | 44.046 |
| 6 | | | |
| 7 | | | |
| 8 | 1.834 | 37.35 | 19.369 |
| 9 | | | |
| 10 | 1.609 | 46.44 | 20.223 |
| 11 | | | |
| 12 | 2.002 | 19.32 | −7.668 |
| 13 | | | |
| 14 | 1.517 | 64.20 | 13.620 |
| 15 | | | |
| 16 | 1.517 | 64.2 | |
| 17 | | | |
| 18 | | | |

Reference Wavelength = 555 nm

TABLE 4

The aspheric surface parameters of the second optical embodiment
Table 4. Aspheric Coefficients

| | Surface | | | |
|---|---|---|---|---|
| | 1 | 2 | 3 | 4 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| | Surface | | | |
|---|---|---|---|---|
| | 5 | 6 | 8 | 9 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| | Surface | | | |
|---|---|---|---|---|
| | 10 | 11 | 12 | 13 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| | Surface | |
|---|---|---|
| | 14 | 15 |
| k | 0.000000E+00 | 0.000000E+00 |
| A4 | 0.000000E+00 | 0.000000E+00 |
| A6 | 0.000000E+00 | 0.000000E+00 |
| A8 | 0.000000E+00 | 0.000000E+00 |
| A10 | 0.000000E+00 | 0.000000E+00 |
| A12 | 0.000000E+00 | 0.000000E+00 |

In the second optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 3 and Table 4.

| The second optical embodiment (Primary reference wavelength: 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.3764 | 0.0478 | 0.1081 | 0.2458 | 0.2354 | 0.6208 |
| \| f/f7 \| | ΣPPR | ΣNPR | ΣPPR/\|ΣNPR\| | IN12/f | IN67/f |
| 0.3495 | 1.3510 | 0.6327 | 2.1352 | 2.8858 | 0.0451 |
| \| f1/f2 \| | \| f2/f3 \| | (TP1 + IN12)/TP2 | | (TP7 + IN67)/TP6 | |
| 0.1271 | 2.2599 | 3.7428 | | 1.0296 | |
| HOS | InTL | HOS/HOI | InS/HOS | ODT % | TDT % |
| 81.6178 | 70.9539 | 13.6030 | 0.3451 | −113.2790 | 84.4806 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |
| PhiA | PhiC | PhiD | TH1 | TH2 | HOI |
| 11.962 mm | 12.362 mm | 12.862 mm | 0.25 mm | 0.2 mm | 6 mm |
| PhiA/PhiD | TH1 + TH2 | (TH1 + TH2)/HOI | (TH1 + TH2)/HOS | 2(TH1 + TH2)/PhiA | InTL/HOS |
| 0.9676 | 0.45 mm | 0.075 | 0.0055 | 0.0752 | 0.8693 |
| PSTA | PLTA | NSTA | NLTA | SSTA | SLTA |
| 0.060 mm | −0.005 mm | 0.016 mm | 0.006 mm | 0.020 mm | −0.008 mm |

| Related inflection point values of second optical embodiment (Primary reference wavelength: 555 nm) | | | | | | |
|---|---|---|---|---|---|---|
| HIF111 | 0 | HIF111/HOI | 0 | SGI111 | 0 | \| SGI111 \|/(\| SGI111 \| + TP1) 0 |

The values stated as follows may be deduced according to Table 3 and Table 4.

| The second optical embodiment (Primary reference wavelength: 555 nm) | | | | | |
|---|---|---|---|---|---|
| ARE | 1/2(HEP) | ARE value | ARE − 1/2(HEP) | 2(ARE/HEP) % | TP | ARE/TP (%) |
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |

| ARS | EHD | ARS value | ARS − EHD | (ARS/EHD)% | TP | ARS/TP (%) |
|---|---|---|---|---|---|---|
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The values stated as follows may be deduced according to Table 3 and Table 4.

The Third Optical Embodiment

Figure 11:
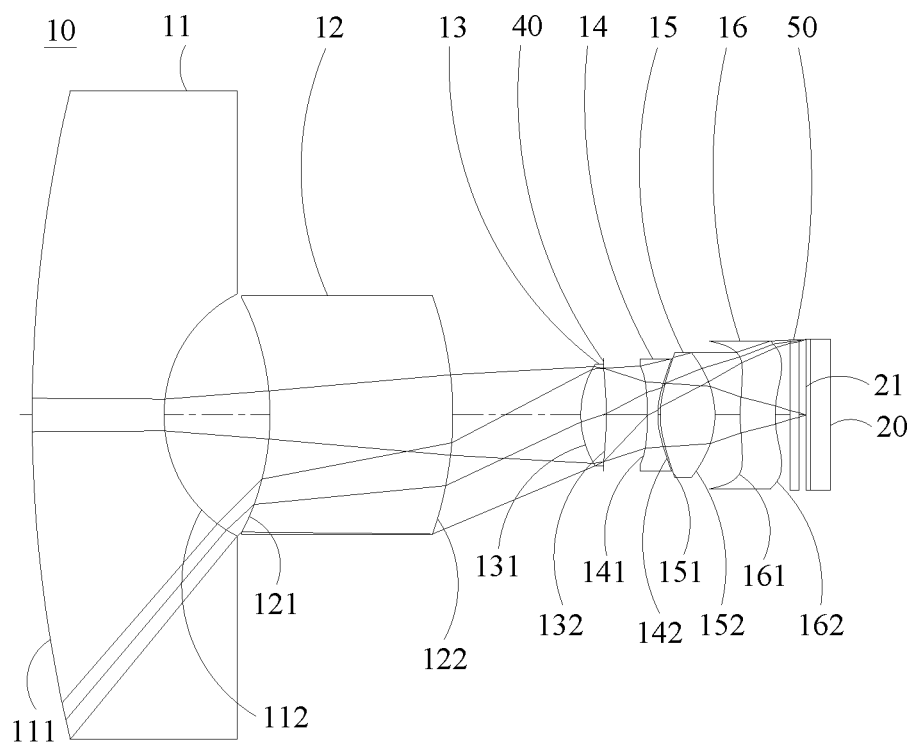
FIG. 11 depicts a configuration diagram of the lens assembly of the switchable image capturing system according to the third optical embodiment of the present invention.

As shown in FIG. 11, the lens assembly 10 includes six lenses with refractive power, which are a first lens 11, a second lens 12, a third lens 13, a four lens 14, a fifth lens 15, and a sixth lens 16 sequentially displayed from an object side to an image side.

Figure 12:
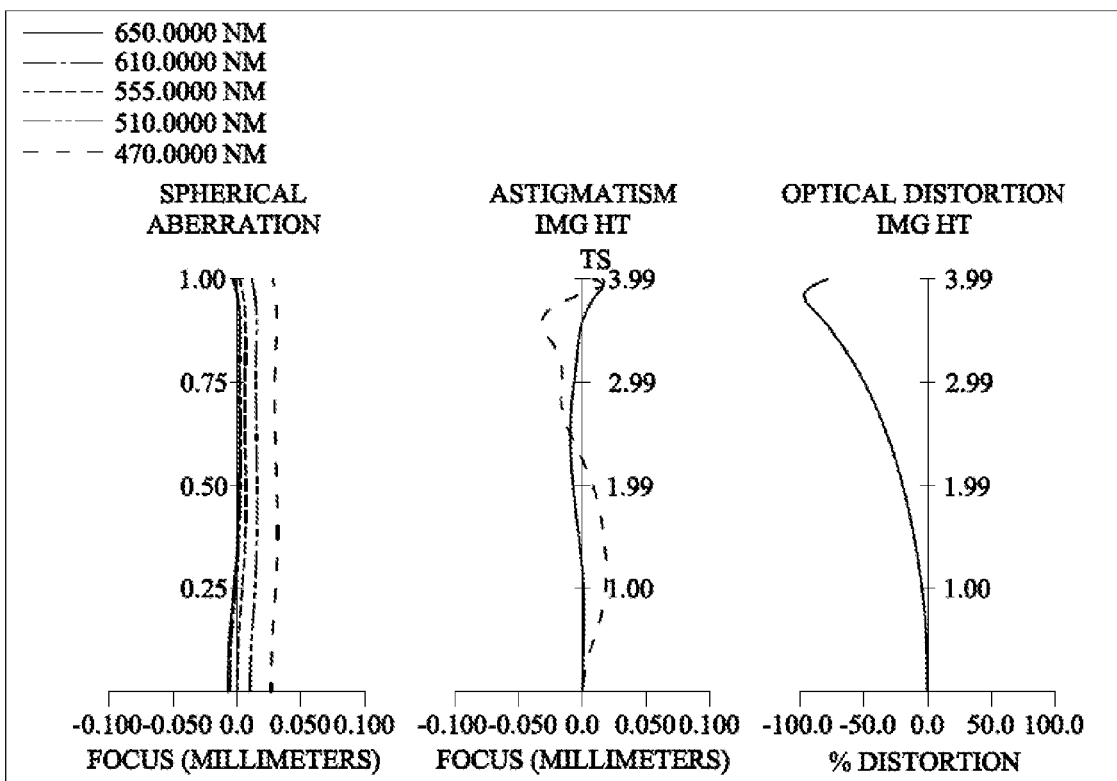
FIG. 12 depicts a curve diagram of the spherical aberration, astigmatism, and optical distortion illustrated sequentially from the left to the right according to the third optical embodiment of the present invention.

Please refer to FIG. 11 and FIG. 12. FIG. 11 depicts a configuration diagram of the lens assembly of the switchable image capturing system according to the third optical embodiment of the present invention. FIG. 27 depicts a curve diagram of the spherical aberration, astigmatism, and optical distortion illustrated sequentially from the left to the right according to the third optical embodiment of the present invention. As shown in FIG. 11, the switchable image capturing system includes a first lens 11, a second lens 12, a third lens 13, an aperture 40, a four lens 14, a fifth lens 15, a sixth lens 16, an IR-cut filter 50, an image plane 21, and image sensor elements 20 sequentially displayed from an object side to an image side.

The first lens 11 has negative refractive power and is made of a glass material. The object side surface 111 thereof is a convex surface and the image side surface 112 thereof is a concave surface, both of which are spherical.

The second lens 12 has negative refractive power and is made of a glass material. The object side surface thereof 121 is a concave surface and the image side surface thereof 122 is a convex surface, both of which are spherical.

The third lens 13 has positive refractive power and is made of a glass material. The object side surface 131 thereof is a convex surface and the image side surface 132 thereof is a convex surface, both of which are aspheric. The object side surface 334 thereof has an inflection point.

The fourth lens 14 has negative refractive power and is made of a plastic material. The object side surface thereof 141 is a concave surface and the image side surface thereof 142 is a concave surface, both of which are aspheric. The image side surface 142 thereof both have an inflection point.

The fifth lens 15 has positive refractive power and is made of a plastic material. The object side surface 151 thereof is a convex surface and the image side surface 152 thereof is a convex surface, both of which are aspheric.

The sixth lens 16 has negative refractive power and is made of a plastic material. The object side surface 161 thereof is a convex surface and the image side surface 162 thereof is a concave surface. The object side surface 161 and the image side surface 162 thereof both have an inflection point. Therefore, it is advantageous for the lens to reduce the back focal length to maintain minimization. In addition, it is effective to suppress the incident angle with incoming light from an off-axis view field and further correct the aberration in the off-axis view field.

The IR-cut filter 50 is made of glass and is disposed between the sixth lens 16 and the image plane 21, which does not affect the focal length of the optical image capturing module.

Please refer to the following Table 5 and Table 6.

TABLE 5

Data of the optical image capturing module of the third optical embodiment
f = 2.808 mm; f/HEP = 1.6; HAF = 100 deg

| Surface | | Curvature radius | Thickness (mm) | Material |
|---|---|---|---|---|
| 0 | Object | 1E+18 | 1E+18 | |
| 1 | Lens 1 | 71.398124 | 7.214 | Glass |
| 2 | | 7.117272355 | 5.788 | |
| 3 | Lens 2 | −13.29213699 | 10.000 | Glass |
| 4 | | −18.37509887 | 7.005 | |
| 5 | Lens 3 | 5.039114804 | 1.398 | Plastic |
| 6 | | −15.53136631 | −0.140 | |
| 7 | Aperture | 1E+18 | 2.378 | |
| 8 | Lens 4 | −18.68613609 | 0.577 | Plastic |
| 9 | | 4.086545927 | 0.141 | |
| 10 | Lens 5 | 4.927609282 | 2.974 | Plastic |
| 11 | | −4.551946605 | 1.389 | |
| 12 | Lens 6 | 9.184876531 | 1.916 | Plastic |
| 13 | | 4.845500046 | 0.800 | |
| 14 | IR-cut filter | 1E+18 | 0.500 | BK_7 |
| 15 | | 1E+18 | 0.371 | |
| 16 | image plane | 1E+18 | 0.005 | |

| Surface | Refractive Index | Dispersion coefficient | Focal length |
|---|---|---|---|
| 0 | | | |
| 1 | 1.702 | 41.15 | −11.765 |
| 2 | | | |
| 3 | 2.003 | 19.32 | −4537.460 |
| 4 | | | |
| 5 | 1.514 | 56.80 | 7.553 |
| 6 | | | |
| 7 | | | |
| 8 | 1.661 | 20.40 | −4.978 |
| 9 | | | |
| 10 | 1.565 | 58.00 | 4.709 |
| 11 | | | |
| 12 | 1.514 | 56.80 | −23.405 |
| 13 | | | |
| 14 | 1.517 | 64.13 | |
| 15 | | | |
| 16 | | | |

Reference wavelength (d-line) = 555 nm

TABLE 6

The aspheric surface parameters of the third optical embodiment
Table 6. Aspheric Coefficients

| Surface No | 1 | 2 | 3 | 4 |
|---|---|---|---|---|
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |

| Surface No | 5 | 6 | 8 | 9 |
|---|---|---|---|---|
| k | 1.318519E−01 | 3.120384E+00 | −1.494442E+01 | 2.744228E−02 |
| A4 | 6.405246E−05 | 2.103942E−03 | −1.598286E−03 | −7.291825E−03 |
| A6 | 2.278341E−05 | −1.050629E−04 | −9.177115E−04 | 9.730714E−05 |
| A8 | −3.672908E−06 | 6.168906E−06 | 1.011405E−04 | 1.101816E−06 |
| A10 | 3.748457E−07 | −1.224682E−07 | −4.919835E−06 | −6.849076E−07 |

| Surface No | 10 | 11 | 12 | 13 |
|---|---|---|---|---|
| k | −7.864013E+00 | −2.263702E+00 | −4.206923E+01 | −7.030803E+00 |
| A4 | 1.405243E−04 | −3.919567E−03 | −1.679499E−03 | −2.640099E−03 |
| A6 | 1.837602E−04 | 2.683449E−04 | −3.518520E−04 | −4.507651E−05 |
| A8 | −2.173368E−05 | −1.229452E−05 | 5.047353E−05 | −2.600391E−05 |
| A10 | 7.328496E−07 | 4.222621E−07 | −3.851055E−06 | 1.161811E−06 |

In the third optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 5 and Table 6.

| Third optical embodiment (Primary reference wavelength: 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.23865 | 0.00062 | 0.37172 | 0.56396 | 0.59621 | 0.11996 |
| ΣPPR | ΣNPR | ΣPPR/\|ΣNPR\| | IN12/f | IN56/f | TP4/(IN34 + TP4 + IN45) |
| 1.77054 | 0.12058 | 14.68400 | 2.06169 | 0.49464 | 0.19512 |
| \| f1/f2 \| | \| f2/f3 \| | (TP1 + IN12)/TP2 | | (TP6 + IN56)/TP5 | |
| 0.00259 | 600.74778 | 1.30023 | | 1.11131 | |
| HOS | InTL | HOS/HOI | InS/HOS | ODT % | TDT % |
| 42.31580 | 40.63970 | 10.57895 | 0.26115 | −122.32700 | 93.33510 |
| HVT51 | HVT52 | HVT61 | HVT62 | HVT62/HOI | HVT62/HOS |
| 0 | 0 | 2.22299 | 2.60561 | 0.65140 | 0.06158 |
| TP2/TP3 | TP3/TP4 | InRS61 | InRS62 | \| InRS61 \|/TP6 | \| InRS62 \|/TP6 |
| 7.15374 | 2.42321 | −0.20807 | −0.24978 | 0.10861 | 0.13038 |
| PhiA | PhiC | PhiD | TH1 | TH2 | HOI |
| 6.150 mm | 6.41 mm | 6.71 mm | 0.15 mm | 0.13 mm | 4 mm |
| PhiA/PhiD | TH1 + TH2 | (TH1 + TH2)/HOI | (TH1 + TH2)/HOS | 2(TH1 + TH2)/PhiA | InTL/HOS |
| 0.9165 | 0.28 mm | 0.07 | 0.0066 | 0.0911 | 0.9604 |
| PSTA | PLTA | NSTA | NLTA | SSTA | SLTA |
| 0.014 mm | 0.002 mm | −0.003 mm | −0.002 mm | 0.011 mm | −0.001 mm |

The values related to arc lengths may be obtained according to table 5 and table 6.

| Third optical embodiment (Reference wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |

-continued

| Third optical embodiment (Reference wavelength = 555 nm) | | | | | | |
|---|---|---|---|---|---|---|
| ARS | EHD | ARS value | ARS − EHD | (ARS/EHD)% | TP | ARS/TP (%) |
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The values stated as follows may be deduced according to Table 5 and Table 6.

| Related inflection point values of third optical embodiment (Primary reference wavelength: 555 nm) | | | | | | |
|---|---|---|---|---|---|---|
| HIF321 | 2.0367 | HIF321/HOI | 0.5092 | SGI321 | −0.1056 | \| SGI321 \|/(\| SGI321 \| + TP3) |
| | | | | | | 0.0702 |
| HIF421 | 2.4635 | HIF421/HOI | 0.6159 | SGI421 | 0.5780 | \| SGI421 \|/(\| SGI421 \| + TP4) |
| | | | | | | 0.5005 |
| HIF611 | 1.2364 | HIF611/HOI | 0.3091 | SGI611 | 0.0668 | \| SGI611 \|/(\| SGI611 \| + TP6) |
| | | | | | | 0.0337 |
| HIF621 | 1.5488 | HIF621/HOI | 0.3872 | SGI621 | 0.2014 | \| SGI621 \|/(\| SGI621 \| + TP6) |
| | | | | | | 0.0951 |

The Fourth Optical Embodiment

Figure 13:
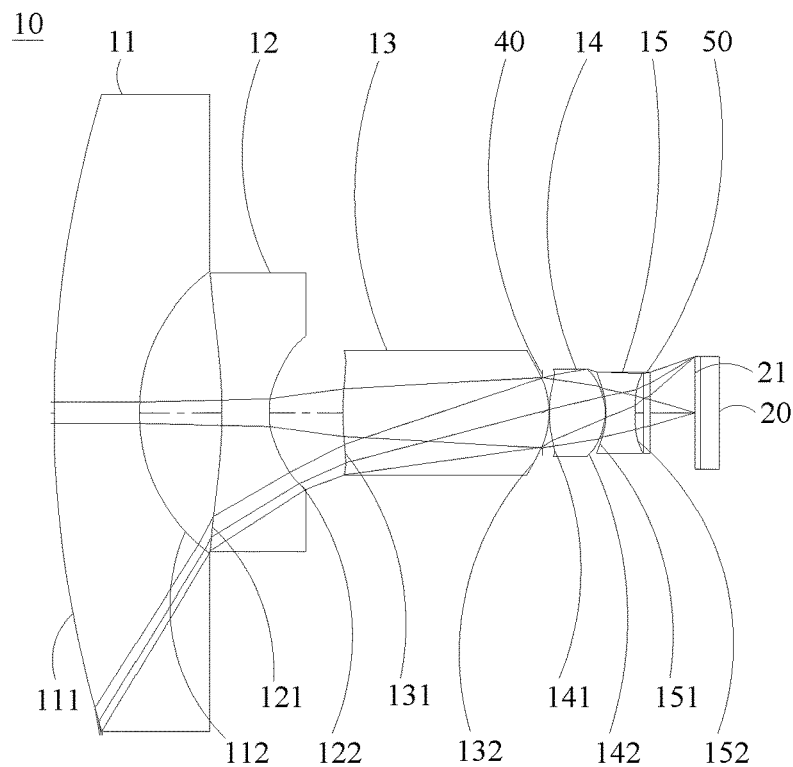
FIG. 13 depicts a configuration diagram of the lens assembly of the switchable image capturing system according to the fourth optical embodiment of the present invention.

As shown in FIG. 13, the lens assembly 10 may include five lenses with refractive power, which are a first lens 11, a second lens 12, a third lens 13, a four lens 14, a fifth lens 15 sequentially displayed from an object side to an image side.

Figure 14:
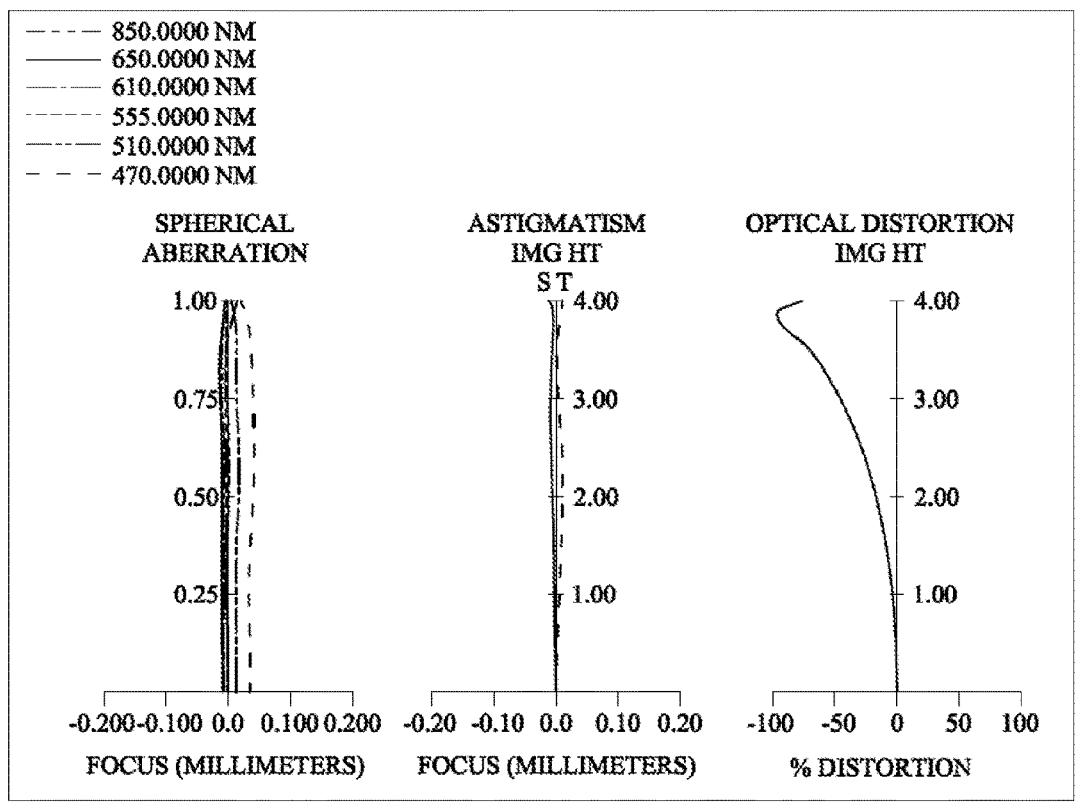
FIG. 14 depicts a curve diagram of the spherical aberration, astigmatism, and optical distortion illustrated sequentially from the left to the right according to the fourth optical embodiment of the present invention.

Please refer to FIG. 13 and FIG. 14. FIG. 13 depicts a configuration diagram of the lens assembly of the switchable image capturing system according to the fourth optical embodiment of the present invention. FIG. 14 depicts a curve diagram of the spherical aberration, astigmatism, and optical distortion illustrated sequentially from the left to the right according to the fourth optical embodiment of the present invention. As shown in FIG. 13, the switchable image capturing system includes a first lens 11, a second lens 12, a third lens 13, an aperture 40, a four lens 14, a fifth lens 15, a sixth lens 16, an IR-cut filter 50, an image plane 21, and image sensor elements 20 sequentially displayed from an object side to an image side.

The first lens 11 has negative refractive power and is made of a glass material. The object side surface 111 thereof is a convex surface and the image side surface 112 thereof is a concave surface, both of which are spherical.

The second lens 12 has negative refractive power and is made of a plastic material. The object side surface thereof 121 is a concave surface and the image side surface thereof 122 is a concave surface, both of which are aspheric. The object side surface 121 has an inflection point.

The third lens 13 has positive refractive power and is made of a plastic material. The object side surface 131 thereof is a convex surface and the image side surface 132 thereof is a convex surface, both of which are aspheric. The object side surface 131 thereof has an inflection point.

The fourth lens 14 has positive refractive power and is made of a plastic material. The object side surface 141 thereof is a convex surface and the image side surface 142 thereof is a concave surface, both of which are aspheric. The object side surface 141 thereof has an inflection point.

The fifth lens 15 has negative refractive power and is made of a plastic material. The object side surface thereof 151 is a concave surface and the image side surface thereof 152 is a concave surface, both of which are aspheric. The object side surface 151 has two inflection points. Therefore, it is advantageous for the lens to reduce the back focal length to maintain minimization.

The IR-cut filter 50 is made of glass and is disposed between the fifth lens 15 and the image plane 21, which does not affect the focal length of the optical image capturing module.

Please refer to the following Table 7 and Table 8.

TABLE 7

Data of the optical image capturing module of the fourth optical embodiment
f = 2.7883 mm; f/HEP = 1.8; HAF = 101 deg

| Surface | | Curvature radius | Thickness(mm) | Material |
|---|---|---|---|---|
| 0 | Object | 1E+18 | 1E+18 | |
| 1 | Lens 1 | 76.84219 | 6.117399 | Glass |
| 2 | | 12.62555 | 5.924382 | |
| 3 | Lens 2 | −37.0327 | 3.429817 | Plastic |
| 4 | | 5.88556 | 5.305191 | |
| 5 | Lens 3 | 17.99395 | 14.79391 | |
| 6 | | −5.76903 | −0.4855 | Plastic |
| 7 | Aperture | 1E+18 | 0.535498 | |
| 8 | Lens 4 | 8.19404 | 4.011739 | Plastic |
| 9 | | −3.84363 | 0.050366 | |
| 10 | Lens 5 | −4.34991 | 2.088275 | Plastic |
| 11 | | 16.6609 | 0.6 | |
| 12 | IR-cut filter | 1E+18 | 0.5 | BK_7 |
| 13 | | 1E+18 | 3.254927 | |
| 14 | Image plane | 1E+18 | −0.00013 | |

| Surface | Refractive index | Dispersion coefficient | Focal length |
|---|---|---|---|
| 0 | | | |
| 1 | 1.497 | 81.61 | −31.322 |
| 2 | | | |
| 3 | 1.565 | 54.5 | −8.70843 |
| 4 | | | |
| 5 | | | |
| 6 | 1.565 | 58 | 9.94787 |
| 7 | | | |
| 8 | 1.565 | 58 | 5.24898 |
| 9 | | | |
| 10 | 1.661 | 20.4 | −4.97515 |
| 11 | | | |
| 12 | 1.517 | 64.13 | |
| 13 | | | |
| 14 | | | |

Reference wavelength(d-line) = 555 nm

TABLE 8

The aspheric surface parameters of the fourth optical embodiment
Table 8. Aspheric Coefficients

| Surface | 1 | 2 | 3 | 4 |
|---|---|---|---|---|
| k | 0.000000E+00 | 0.000000E+00 | 0.131249 | −0.069541 |
| A4 | 0.000000E+00 | 0.000000E+00 | 3.99823E−05 | −8.55712E−04 |
| A6 | 0.000000E+00 | 0.000000E+00 | 9.03636E−08 | −1.96175E−06 |
| A8 | 0.000000E+00 | 0.000000E+00 | 1.91025E−09 | −1.39344E−08 |
| A10 | 0.000000E+00 | 0.000000E+00 | −1.18567E−11 | −4.17090E−09 |
| A12 | 0.000000E+00 | 0.000000E+00 | 0.000000E+00 | 0.000000E+00 |

| Surface | 5 | 6 | 8 | 9 |
|---|---|---|---|---|
| k | −0.324555 | 0.009216 | −0.292346 | −0.18604 |
| A4 | −9.07093E−04 | 8.80963E−04 | −1.02138E−03 | 4.33629E−03 |
| A6 | −1.02465E−05 | 3.14497E−05 | −1.18559E−04 | −2.91588E−04 |
| A8 | −8.18157E−08 | −3.15863E−06 | 1.34404E−05 | 9.11419E−06 |

TABLE 8-continued

The aspheric surface parameters of the fourth optical embodiment
Table 8. Aspheric Coefficients

| | | | | |
|---|---|---|---|---|
| A10 | −2.42621E−09 | 1.44613E−07 | −2.80681E−06 | 1.28365E−07 |
| A12 | 0.000000E+00 | 0.000000E+00 | 0.000000E+00 | 0.000000E+00 |

| Surface | 10 | 11 |
|---|---|---|
| k | −6.17195 | 27.541383 |
| A4 | 1.58379E−03 | 7.56932E−03 |
| A6 | −1.81549E−04 | −7.83858E−04 |
| A8 | −1.18213E−05 | 4.79120E−05 |
| A10 | 1.92716E−06 | −1.73591E−06 |
| A12 | 0.000000E+00 | 0.000000E+00 |

In the fourth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 7 and Table 8.

Fourth optical embodiment (Primary reference wavelength: 555 nm)

| \| f/f1 \| | \| f/f2 \| | \| f/f3 \| | \| f/f4 \| | \| f/f5 \| | \| f1/f2 \| |
|---|---|---|---|---|---|
| 0.08902 | 0.32019 | 0.28029 | 0.53121 | 0.56045 | 3.59674 |
| ΣPPR | ΣNPR | ΣPPR/\|ΣNPR\| | IN12/f | IN45/f | \| f2/f3 \| |
| 1.4118 | 0.3693 | 3.8229 | 2.1247 | 0.0181 | 0.8754 |
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | \| InRS51 \|/TP5 | \| InRS52 \|/TP5 |
| 0.23184 | 3.68765 | −0.679265 | 0.5369 | 0.32528 | 0.25710 |
| PhiA | PhiC | PhiD | TH1 | TH2 | HOI |
| 5.598 mm | 5.858 mm | 6.118 mm | 0.13 mm | 0.13 mm | 4 mm |
| PhiA/PhiD | TH1 + TH2 | (TH1 + TH2)/HOI | (TH1 + TH2)/HOS | 2(TH1 + TH2)/PhiA | InTL/HOS |
| 0.9150 | 0.26 mm | 0.065 | 0.0056 | 0.0929 | 0.9056 |
| PSTA | PLTA | NSTA | NLTA | SSTA | SLTA |
| −0.011 mm | 0.005 mm | −0.010 mm | −0.003 mm | 0.005 mm | −0.00026 mm |

The values related to arc lengths may be obtained according to table 7 and table 8.

Fourth optical embodiment (Reference wavelength = 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 0.775 | 0.774 | −0.00052 | 99.93% | 6.117 | 12.65% |
| 12 | 0.775 | 0.774 | −0.00005 | 99.99% | 6.117 | 12.66% |
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |
| 51 | 0.775 | 0.778 | 0.00311 | 100.40% | 2.088 | 37.24% |
| 52 | 0.775 | 0.774 | −0.00014 | 99.98% | 2.088 | 37.08% |

Fourth optical embodiment (Reference wavelength = 555 nm)

| ARS | EHD | ARS value | ARS − EHD | (ARS/EHD)% | TP | ARS/TP (%) |
|---|---|---|---|---|---|---|
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The values stated as follows may be deduced according to Table 7 and Table 8.

| \multicolumn{6}{c}{Related inflection point values of fourth optical embodiment (Primary reference wavelength: 555 nm)} |
|---|---|---|---|---|---|
| HIF211 | 6.3902 | HIF211/HOI | 1.5976 | SGI211 | −0.4793 | SGI211 I/ (I SGI211 I + TP2) | 0.1226 |
| HIF311 | 2.1324 | HIF311/HOI | 0.5331 | SGI311 | 0.1069 I SGI311 I/ (I SGI311 I + TP3) | 0.0072 |
| HIF411 | 2.0278 | HIF411/HOI | 0.5070 | SGI411 | 0.2287 I SGI411 I/ (I SGI411 I + TP4) | 0.0539 |
| HIF511 | 2.6253 | HIF511/HOI | 0.6563 | SGI511 | −0.5681 I SGI511 I/ (I SGI511 I + TP5) | 0.2139 |
| HIF512 | 2.1521 | HIF512/HOI | 0.5380 | SGI512 | −0.8314 I SGI512 I/ (I SGI512 I + TP5) | 0.2848 |

The Fifth Optical Embodiment

Figure 15:
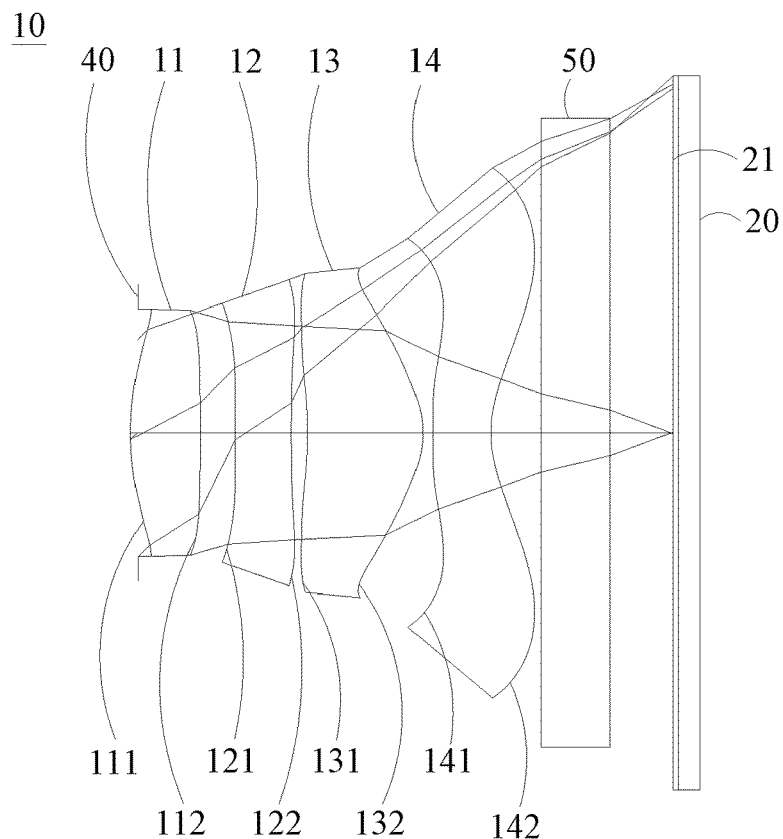
FIG. 15 depicts a configuration diagram of the lens assembly of the switchable image capturing system according to the fifth optical embodiment of the present invention.

As shown in FIG. 15, the lens assembly 10 includes fourth lenses with refractive power, which are a first lens 11, a second lens 12, a third lens 13, and a four lens 14 sequentially displayed from an object side to an image side.

Figure 16:
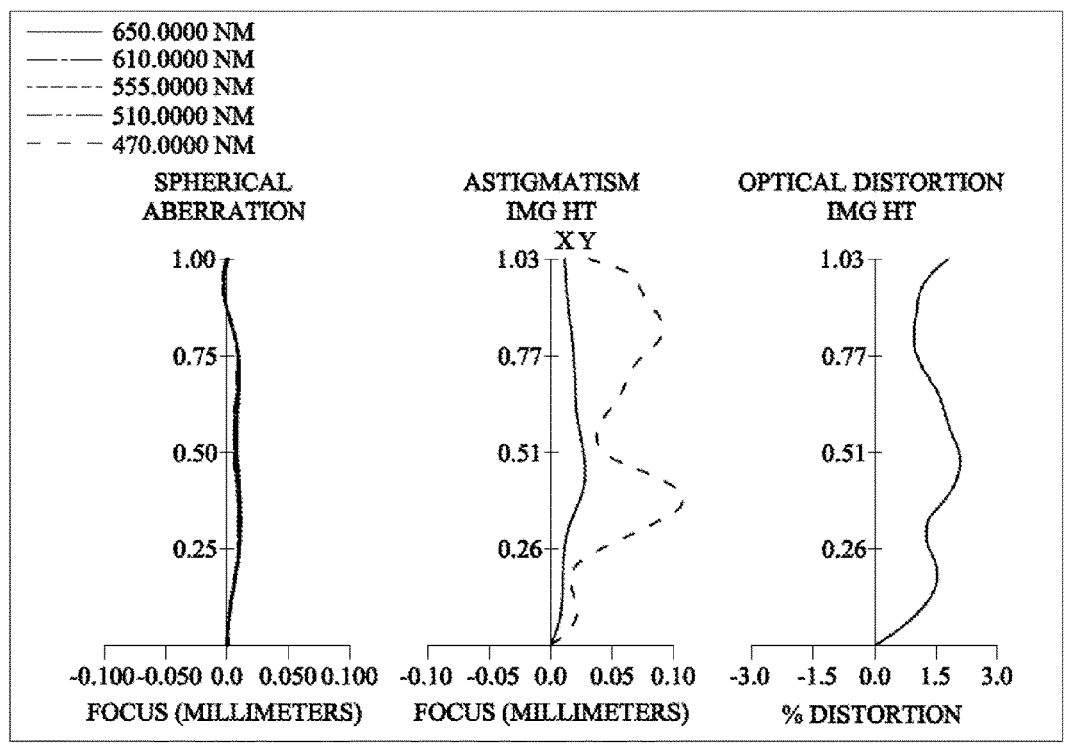
FIG. 16 depicts a curve diagram of the spherical aberration, astigmatism, and optical distortion illustrated sequentially from the left to the right according to the fifth optical embodiment of the present invention.

Please refer to FIG. 15 and FIG. 16. FIG. 15 depicts a configuration diagram of the lens assembly of the switchable image capturing system according to the fifth optical embodiment of the present invention. FIG. 16 depicts a curve diagram of the spherical aberration, astigmatism, and optical distortion illustrated sequentially from the left to the right according to the fifth optical embodiment of the present invention. As shown in FIG. 15, the switchable image capturing system includes an aperture 40, a first lens 11, a second lens 12, a third lens 13, a four lens 14, an IR-cut filter 50, an image plane 21, and image sensor elements 20 sequentially displayed from an object side to an image side.

The first lens 11 has positive refractive power and is made of a plastic material. The object side surface 111 thereof is a convex surface and the image side surface 112 thereof is a convex surface, both of which are aspheric. The object side surface 111 thereof has an inflection point.

The second lens 12 has negative refractive power and is made of a plastic material. The object side surface thereof 121 is a convex surface and the image side surface thereof 122 is a concave surface, both of which are aspheric. The object side surface 121 has two inflection points and the image side surface 122 thereof has an inflection point.

The third lens 13 has positive refractive power and is made of a plastic material. The object side surface 131 thereof is a concave surface and the image side surface 132 thereof is a convex surface, both of which are aspheric. The object side surface 131 thereof has three inflection points and the image side surface 132 thereof has an inflection point.

The fourth lens 14 has negative refractive power and is made of a plastic material. The object side surface thereof 141 is a concave surface and the image side surface thereof 142 is a concave surface, both of which are aspheric. The object side surface thereof 141 has two inflection points and the image side surface 142 thereof has an inflection point.

The IR-cut filter 50 is made of glass and is disposed between the fourth lens 14 and the image plane 21, which does not affect the focal length of the optical image capturing module.

Please refer to the following Table 9 and Table 10.

TABLE 9

Data of the optical image capturing module of the fifth optical embodiment
f = 1.04102 mm; f/HEP = 1.4; HAF = 44.0346 deg

| Surface | | Curvature Radius | Thickness (mm) | Material |
|---|---|---|---|---|
| 0 | Object | 1E+18 | 600 | |
| 1 | Aperture | 1E+18 | −0.020 | |
| 2 | Lens 1 | 0.890166851 | 0.210 | Plastic |
| 3 | | −29.11040115 | −0.010 | |
| 4 | | 1E+18 | 0.116 | |
| 5 | Lens 2 | 10.67765398 | 0.170 | Plastic |
| 6 | | 4.977771922 | 0.049 | |
| 7 | Lens 3 | −1.191436932 | 0.349 | Plastic |
| 8 | | −0.248990674 | 0.030 | |
| 9 | Lens 4 | −38.08537212 | 0.176 | Plastic |
| 10 | | 0.372574476 | 0.152 | |
| 11 | IR-cut filter | 1E+18 | 0.210 | BK_7 |
| 12 | | 1E+18 | 0.185 | |
| 13 | Image plane | 1E+18 | 0.005 | |

| Surface | Refractive index | Dispersion coefficient | Focal length |
|---|---|---|---|
| 0 | | | |
| 1 | | | |
| 2 | 1.545 | 55.96 | 1.587 |
| 3 | | | |
| 4 | | | |
| 5 | 1.642 | 22.46 | −14.569 |
| 6 | | | |
| 7 | 1.545 | 55.96 | 0.510 |
| 8 | | | |
| 9 | 1.642 | 22.46 | −0.569 |
| 10 | | | |
| 11 | 1.517 | 64.13 | |
| 12 | | | |
| 13 | | | |

Reference wavelength (d-line) = 555 nm.

Shield position: The radius of the clear aperture of the fourth surface is 0.360 mm.

TABLE 10

The aspheric surface parameters of the fifth optical embodiment
Table 10. Aspheric Coefficients

| Surface | 2 | 3 | 5 | 6 |
|---|---|---|---|---|
| k = | −1.106629E+00 | 2.994179E−07 | −7.788754E+01 | −3.440335E+01 |
| A4 = | 8.291155E−01 | −6.401113E−01 | −4.958114E+00 | −1.875957E+00 |
| A6 = | −2.398799E+01 | −1.265726E+01 | 1.299769E+02 | 8.568480E+01 |
| A8 = | 1.825378E+02 | 8.457286E+01 | −2.736977E+03 | −1.279044E+03 |
| A10 = | −6.211133E+02 | −2.157875E+02 | 2.908537E+04 | 8.661312E+03 |
| A12 = | −4.719066E+02 | −6.203600E+02 | −1.499597E+05 | −2.875274E+04 |
| A14 = | 0.000000E+00 | 0.000000E+00 | 2.992026E+05 | 3.764871E+04 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| Surface | 7 | 8 | 9 | 10 |
|---|---|---|---|---|
| k = | −8.522097E−01 | −4.735945E+00 | −2.277155E+01 | −8.039778E−01 |
| A4 = | −4.878227E−01 | −2.490377E+00 | 1.672704E+01 | −7.613206E+00 |
| A6 = | 1.291242E+02 | 1.524149E+02 | −3.260722E+02 | 3.374046E+01 |
| A8 = | −1.979689E+03 | −4.841033E+03 | 3.373231E+03 | −1.368453E+02 |
| A10 = | 1.456076E+04 | 8.053747E+04 | −2.177676E+04 | 4.049486E+02 |
| A12 = | −5.975920E+04 | −7.936887E+05 | 8.951687E+04 | −9.711797E+02 |
| A14 = | 1.351676E+05 | 4.811528E+06 | −2.363737E+05 | 1.942574E+03 |
| A16 = | −1.329001E+05 | −1.762293E+07 | 3.983151E+05 | −2.876356E+03 |
| A18 = | 0.000000E+00 | 3.579891E+07 | −4.090689E+05 | 2.562386E+03 |
| A20 = | 0.000000E+00 | −3.094006E+07 | 2.056724E+05 | −9.943657E+02 |

In the fifth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 9 and Table 10.

| Fifth optical embodiment (Primary reference wavelength: 555 nm) | | | | | |
|---|---|---|---|---|---|
| InRS41 | InRS42 | HVT41 | HVT42 | ODT % | TDT % |
| −0.07431 | 0.00475 | 0.00000 | 0.53450 | 2.09403 | 0.84704 |
| \| f/f1 \| | \| f/f2 \| | \| f/f3 \| | \| f/f4 \| | \| f1/f2 \| | \| f2/f3 \| |
| 0.65616 | 0.07145 | 2.04129 | 1.83056 | 0.10890 | 28.56826 |
| ΣPPR | ΣNPR | ΣPPR/\|ΣNPR\| | ΣPP | ΣNP | f1/ΣPP |
| 2.11274 | 2.48672 | 0.84961 | −14.05932 | 1.01785 | 1.03627 |
| f4/ΣNP | IN12/f | IN23/f | IN34/f | TP3/f | TP4/f |
| 1.55872 | 0.10215 | 0.04697 | 0.02882 | 0.33567 | 0.16952 |
| InTL | HOS | HOS/HOI | InS/HOS | InTL/HOS | ΣTP/InTL |
| 1.09131 | 1.64329 | 1.59853 | 0.98783 | 0.66410 | 0.83025 |
| (TP1 + IN12)/TP2 | (TP4 + IN34)/TP3 | TP1/TP2 | TP3/TP4 | IN23/(TP2 + IN23 + TP3) | |
| 1.86168 | 0.59088 | 1.23615 | 1.98009 | 0.08604 | |
| \| InRS41 \|/TP4 | \| InRS42 \|/TP4 | HVT42/HOI | HVT42/HOS | InTL/HOS | |
| 0.4211 | 0.0269 | 0.5199 | 0.3253 | 0.6641 | |
| PhiA | PhiC | PhiD | TH1 | TH2 | HOI |
| 1.596 mm | 1.996 mm | 2.396 mm | 0.2 mm | 0.2 mm | 1.028 mm |
| PhiA/PhiD | TH1 + TH2 | (TH1 + TH2)/HOI | (TH1 + TH2)/HOS | 2(TH1 + TH2)/PhiA | |
| 0.7996 | 0.4 mm | 0.3891 | 0.2434 | 0.5013 | |
| PSTA | PLTA | NSTA | NLTA | SSTA | SLTA |
| −0.029 mm | −0.023 mm | −0.011 mm | −0.024 mm | 0.010 mm | 0.011 mm |

The values stated as follows may be deduced according to Table 9 and Table 10.

| Related inflection point values of fifth optical embodiment (Primary reference wavelength: 555 nm) | | | | | |
|---|---|---|---|---|---|
| HIF111 | 0.28454 | HIF111/HOI 0.27679 | SGI111 | 0.04361 | \| SGI111 \|/(\| SGI111 \| + TP1) 0.17184 |
| HIF211 | 0.04198 | HIF211/HOI 0.04083 | SGI211 | 0.00007 | \| SGI211 \|/(\| SGI211 \| + TP2) 0.00040 |

-continued

Related inflection point values of fifth optical embodiment (Primary reference wavelength: 555 nm)

| | | | | | | |
|---|---|---|---|---|---|---|
| HIF212 | 0.37903 | HIF212/HOI | 0.36871 | SGI212 | −0.03682 | \| SGI212 \|/ (\| SGI212 \| + TP2) | 0.17801 |
| HIF221 | 0.25058 | HIF221/HOI | 0.24376 | SGI221 | 0.00695 | \| SGI221 \|/ (\| SGI221 \| + TP2) | 0.03927 |
| HIF311 | 0.14881 | HIF311/HOI | 0.14476 | SGI311 | −0.00854 | \| SGI311 \|/ (\| SGI311 \| + TP3) | 0.02386 |
| HIF312 | 0.31992 | HIF312/HOI | 0.31120 | SGI312 | −0.01783 | \| SGI312 \|/ (\| SGI312 \| + TP3) | 0.04855 |
| HIF313 | 0.32956 | HIF313/HOI | 0.32058 | SGI313 | −0.01801 | \| SGI313 \|/ (\| SGI313 \| + TP3) | 0.04902 |
| HIF321 | 0.36943 | HIF321/HOI | 0.35937 | SGI321 | −0.14878 | \| SGI321 \|/ (\| SGI321 \| + TP3) | 0.29862 |
| HIF411 | 0.01147 | HIF411/HOI | 0.01116 | SGI411 | −0.00000 | \| SGI411 \|/ (\| SGI411 \| + TP4) | 0.00001 |
| HIF412 | 0.22405 | HIF412/HOI | 0.21795 | SGI412 | 0.01598 | \| SGI412 \|/ (\| SGI412 \| + TP4) | 0.08304 |
| HIF421 | 0.24105 | HIF421/HOI | 0.23448 | SGI421 | 0.05924 | \| SGI421 \|/ (\| SGI421 \| + TP4) | 0.25131 |

The values related to arc lengths may be obtained according to table 9 and table 10.

Fifth optical embodiment (Reference wavelength = 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.372 | 0.375 | 0.00267 | 100.72% | 0.170 | 220.31% |
| 22 | 0.372 | 0.371 | −0.00060 | 99.84% | 0.170 | 218.39% |
| 31 | 0.372 | 0.372 | −0.00023 | 99.94% | 0.349 | 106.35% |
| 32 | 0.372 | 0.404 | 0.03219 | 108.66% | 0.349 | 115.63% |
| 41 | 0.372 | 0.373 | 0.00112 | 100.30% | 0.176 | 211.35% |
| 42 | 0.372 | 0.387 | 0.01533 | 104.12% | 0.176 | 219.40% |

| ARS | EHD | ARS value | ARS − EHD | (ARS/EHD)% | TP | ARS/TP (%) |
|---|---|---|---|---|---|---|
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.387 | 0.391 | 0.00383 | 100.99% | 0.170 | 229.73% |
| 22 | 0.458 | 0.460 | 0.00202 | 100.44% | 0.170 | 270.73% |
| 31 | 0.476 | 0.478 | 0.00161 | 100.34% | 0.349 | 136.76% |
| 32 | 0.494 | 0.538 | 0.04435 | 108.98% | 0.349 | 154.02% |
| 41 | 0.585 | 0.624 | 0.03890 | 106.65% | 0.176 | 353.34% |
| 42 | 0.798 | 0.866 | 0.06775 | 108.49% | 0.176 | 490.68% |

The Sixth Optical Embodiment

Figure 17:
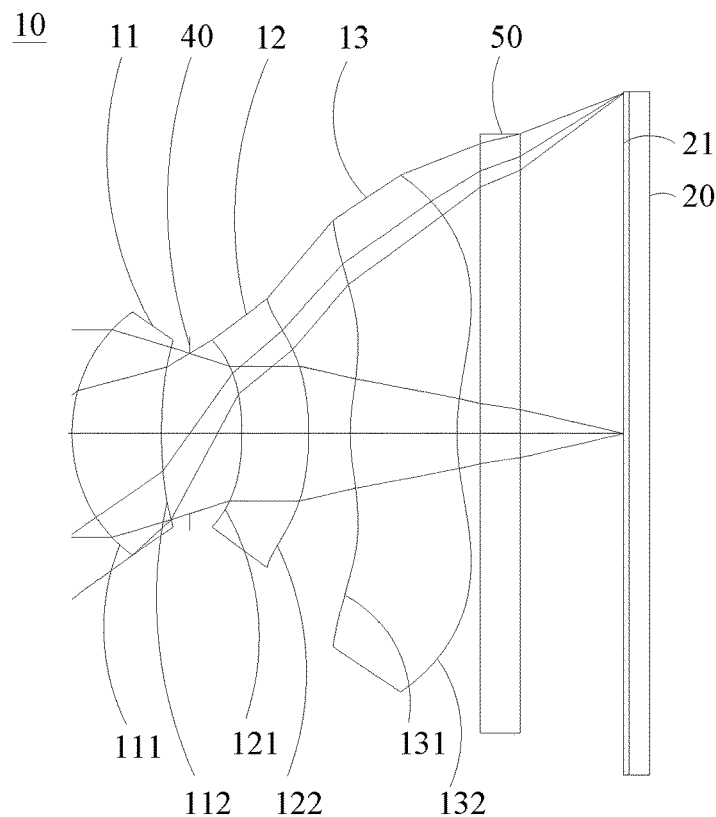
FIG. 17 depicts a configuration diagram of the lens assembly of the switchable image capturing system according to the sixth optical embodiment of the present invention.
Figure 18:
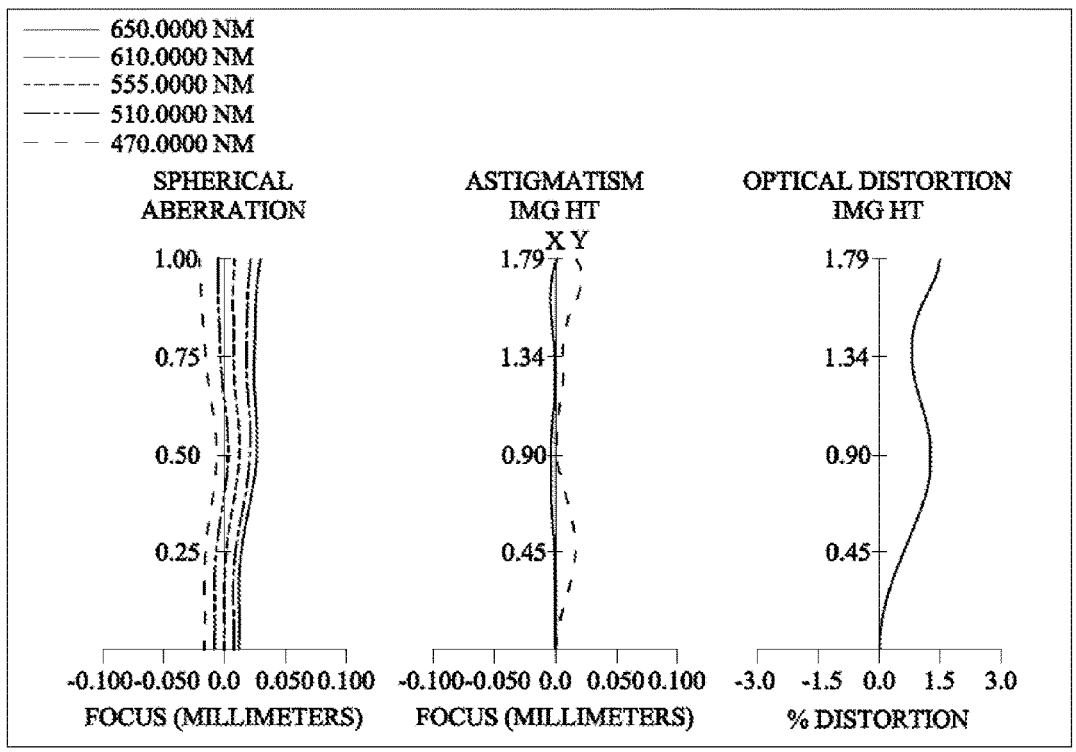
FIG. 18 depicts a curve diagram of the spherical aberration, astigmatism, and optical distortion illustrated sequentially from the left to the right according to the sixth optical embodiment of the present invention.

Please refer to FIG. 17 and FIG. 18. FIG. 17 depicts a configuration diagram of the lens assembly of the switchable image capturing system according to the sixth optical embodiment of the present invention. FIG. 18 depicts a curve diagram of the spherical aberration, astigmatism, and optical distortion illustrated sequentially from the left to the right according to the sixth optical embodiment of the present invention. As shown in FIG. 17, the switchable image capturing system includes a first lens 11, an aperture 40, a second lens 12, a third lens 13, an IR-cut filter 50, an image plane 21, and image sensor elements 20 sequentially displayed from an object side to an image side.

The first lens 11 has positive refractive power and is made of a plastic material. The object side surface 111 thereof is a convex surface and the image side surface 112 thereof is a concave surface, both of which are aspheric.

The second lens 12 has negative refractive power and is made of a plastic material. The object side surface thereof 121 is a concave surface and the image side surface thereof 122 is a convex surface, both of which are aspheric. The image side surface 122 thereof both has an inflection point.

The third lens 13 has positive refractive power and is made of a plastic material. The object side surface 131 thereof is a convex surface and the image side surface 132 thereof is a concave surface, both of which are aspheric. The object side surface 131 thereof has two inflection points and the image side surface 132 thereof has an infection point.

The IR-cut filter 50 is made of glass and is disposed between the third lens 13 and the image plane 21, which does not affect the focal length of the optical image capturing module.

Please refer to the following Table 11 and Table 12.

TABLE 11

Data of the optical image capturing module of the sixth optical embodiment
f = 2.41135 mm; f/HEP = 2.22; HAF = 36 deg

| Surface | | Curvature radius | Thickness (mm) | Material |
|---|---|---|---|---|
| 0 | Object | 1E+18 | 600 | |
| 1 | Lens 1 | 0.840352226 | 0.468 | Plastic |
| 2 | | 2.271975602 | 0.148 | |
| 3 | Aperture | 1E+18 | 0.277 | |
| 4 | Lens 2 | −1.157324239 | 0.349 | Plastic |
| 5 | | −1.968404008 | 0.221 | |
| 6 | Lens 3 | 1.151874235 | 0.559 | Plastic |
| 7 | | 1.338105159 | 0.123 | |
| 8 | IR-cut filter | 1E+18 | 0.210 | BK7 |
| 9 | | 1E+18 | 0.547 | |
| 10 | Image plane | 1E+18 | 0.000 | |

| Surface | Refractive index | Dispersion coefficient | Focal length |
|---|---|---|---|
| 0 | | | |
| 1 | 1.535 | 56.27 | 2.232 |
| 2 | | | |
| 3 | | | |
| 4 | 1.642 | 22.46 | −5.221 |
| 5 | | | |
| 6 | 1.544 | 56.09 | 7.360 |
| 7 | | | |
| 8 | 1.517 | 64.13 | |
| 9 | | | |
| 10 | | | |

Reference wavelength (d-line) = 555 nm.
Shield position: The radius of the clear aperture of the first surface is 0.640 mm

TABLE 12

The aspheric surface parameters of the sixth optical embodiment
Table 12. Aspheric Coefficients

| Surface | 1 | 2 | 4 | 5 |
|---|---|---|---|---|
| k = | −2.019203E−01 | 1.528275E+01 | 3.743939E+00 | −1.207814E+01 |
| A4 = | 3.944883E−02 | −1.670490E−01 | −4.266331E−01 | −1.696843E+00 |
| A6 = | 4.774062E−01 | 3.857435E+00 | −1.423859E+00 | 5.164775E+00 |
| A8 = | −1.528780E+00 | −7.091408E+01 | 4.119587E+01 | −1.445541E+01 |
| A10 = | 5.133947E+00 | 6.365801E+02 | −3.456462E+02 | 2.876958E+01 |
| A12 = | −6.250496E+00 | −3.141002E+03 | 1.495452E+03 | −2.662400E+01 |
| A14 = | 1.068803E+00 | 7.962834E+03 | −2.747802E+03 | 1.661634E+01 |
| A16 = | 7.995491E+00 | −8.268637E+03 | 1.443133E+03 | −1.327827E+01 |

| Surface | 6 | 7 |
|---|---|---|
| k = | −1.276860E+01 | −3.034004E+00 |
| A4 = | −7.396546E−01 | −5.308488E−01 |
| A6 = | 4.449101E−01 | 4.374142E−01 |
| A8 = | 2.622372E−01 | −3.111192E−01 |
| A10 = | −2.510946E−01 | 1.354257E−01 |
| A12 = | −1.048030E−01 | −2.652902E−02 |
| A14 = | 1.462137E−01 | −1.203306E−03 |
| A16 = | −3.676651E−02 | 7.805611E−04 |

In the sixth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 11 and Table 12.

| Sixth optical embodiment (Primary reference wavelength: 555 nm) | | | | | |
|---|---|---|---|---|---|
| \| f/f1 \| | \| f/f2 \| | \| f/f3 \| | \| f1/f2 \| | \| f2/f3 \| | TP1/TP2 |
| 1.08042 | 0.46186 | 0.32763 | 2.33928 | 1.40968 | 1.33921 |
| ΣPPR | ΣNPR | ΣPPR/\|ΣNPR\| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | \| ODT \| % | \| TDT \| % |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| PhiA | PhiC | PhiD | TH1 | TH2 | HOI |
| 2.716 mm | 3.116 mm | 3.616 mm | 0.25 mm | 0.2 mm | 1.792 mm |
| PhiA/PhiD | TH1 + TH2 | (TH1 + TH2)/HOI | (TH1 + TH2)/HOS | 2(TH1 + TH2)/PhiA | InTL/HOS |
| 0.7511 | 0.45 mm | 0.2511 | 0.1551 | 0.3314 | 0.6970 |
| PLTA | PSTA | NLTA | NSTA | SLTA | SSTA |
| −0.002 mm | 0.008 mm | 0.006 mm | −0.008 mm | −0.007 mm | 0.006 mm |

The values stated as follows may be deduced according to Table 11 and Table 12.

| Related inflection point values of sixth optical embodiment (Primary reference wavelength: 555 nm) | | | | | | |
|---|---|---|---|---|---|---|
| HIF221 | 0.5599 | HIF221/HOI | 0.3125 | SGI221 | 0.1487 | \| SGI221 \|/(\| SGI221 \| + TP2) | 0.2412 |
| HIF311 | 0.2405 | HIF311/HOI | 0.1342 | SGI311 | 0.0201 | \| SGI311 \|/(\| SGI311 \| + TP3) | 0.0413 |
| HIF312 | 0.8255 | HIF312/HOI | 0.4607 | SGI312 | 0.0234 | \| SGI312 \|/(\| SGI312 \| + TP3) | 0.0476 |
| HIF321 | 0.3505 | HIF321/HOI | 0.1956 | SGI321 | 0.0371 | \| SGI321 \|/(\| SGI321 \| + TP3) | 0.0735 |

The values related to arc lengths may be obtained according to table 11 and table 12.

| Sixth optical embodiment (Reference wavelength = 555 nm) | | | | | | |
|---|---|---|---|---|---|---|
| ARE | 1/2(HEP) | ARE value | ARE − 1/2(HEP) | 2(ARE/ HEP) % | TP | ARE/ TP (%) |
| 11 | 0.546 | 0.598 | 0.052 | 109.49% | 0.468 | 127.80% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |

| ARS | EHD | ARS value | ARS − EHD | (ARS/ EHD)% | TP | ARS/ TP (%) |
|---|---|---|---|---|---|---|
| 11 | 0.640 | 0.739 | 0.099 | 115.54% | 0.468 | 158.03% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.706 | 0.750 | 0.044 | 106.28% | 0.349 | 214.72% |
| 31 | 1.118 | 1.135 | 0.017 | 101.49% | 0.559 | 203.04% |
| 32 | 1.358 | 1.489 | 0.131 | 109.69% | 0.559 | 266.34% |

In addition, the present invention further provides an image capturing system including the switchable image capturing system according to the aforementioned embodiment, which may be applied to one of an electronic portable device, an electronic wearable device, an electronic monitoring device, an electronic information device, an electronic communication device, a machine vision device, a vehicle electronic device, and any combination thereof.

Specifically, the switchable image capturing system of the present invention may be an electronic portable device, an electronic wearable device, an electronic monitoring device, an electronic information device, an electronic communication device, a machine vision device, a vehicle electronic device, and any combination thereof. Moreover, required space may be minimized and visible areas of the screen may be increased by using different numbers of lens assemblies depending on requirements.

To sum up, the switchable image capturing system of the present invention controls the image time of the image sensor 20 through modulating the electro-optical switch 30, thereby interrupting or continuing filming with the image sensor 20 according to the user's needs. In short, the switchable image capturing system of the present invention has the aforementioned advantages which provide protection for user's privacy.

The above description is merely illustrative rather than restrictive. Any spirit and scope without departing from the present invention as to equivalent modifications or alterations are intended to be included in the following claims.

What is claimed is:

1. A switchable image capturing system comprising:
   at least one image sensor positioned in a direction in which a light travels;
   at least one lens assembly positioned in the direction in which the light travels and in front of each of the image sensors, and an optical axis of the lens assembly overlapping a central normal line of a sensing surface of the image sensors in such a way that the light focuses on the image sensor;
   at least one electro-optical switch positioned in the direction in which the light travels, and each of the electro-optical switches changing a transmission rate thereof according to a control signal to obstruct a travel route of the light or to make the light pass through each of the electro-optical switches; and
   a microcontroller electrically connected to each of the electro-optical switches;
   wherein each of the electro-optical switches comprises a first substrate, a first transparent conductive layer, an auxiliary electrode layer, an electrolyte layer, an electrochromic layer, a second transparent conductive layer, and a second substrate; the first transparent conductive layer is disposed on the first substrate, the auxiliary electrode layer is disposed on the first transparent conductive layer, the electrolyte layer is disposed on the auxiliary electrode layer, the electrochromic layer is disposed on the electrolyte layer, the second transparent conductive layer is disposed on the electrochromic layer, and the second substrate is disposed on the second transparent conductive layer.

2. The switchable image capturing system according to claim 1, the microcontroller sends the control signal to each of the electro-optical switches according to a user command.

3. The switchable image capturing system according to claim 2, the microcontroller sends the control signal having a first voltage to each of the electro-optical switches according to the user command, and each of the electro-optical switches decreases a transmission rate thereof to obstruct a travel route of the light.

4. The switchable image capturing system according to claim 2, the microcontroller sends the control signal having a second voltage to each of the electro-optical switches according to the user command, and each of the electro-optical switches increases the transmission rate thereof to make the light pass through each of the electro-optical switches.

5. The switchable image capturing system according to claim 1, wherein a placement position of each of the electro-optical switches is perpendicular to the direction in which the light travels.

6. The switchable image capturing system according to claim 1, wherein each of the electro-optical switches is positioned in front of each of the lens assemblies, and the first substrate and the second substrate are positioned at a side adjacent to the lens assembly.

7. The switchable image capturing system according to claim 1, wherein each of the electro-optical switches is positioned between each of is lens assemblies and each of the image sensors, and the first substrate and the second substrate are positioned at a side adjacent to the lens assembly.

8. The switchable image capturing system according to claim 1, wherein each of the electro-optical switches is positioned between two lenses adjacent to each of the lens assemblies.

9. The switchable image capturing system according to claim 1, wherein each of the electro-optical switches further comprises a sealing structure; the sealing structure is disposed between the first substrate and the second substrate and surrounds the auxiliary electrode layer, the electrolyte layer, and the electrochromic layer.

10. The switchable image capturing system according to claim 1, wherein materials of the electrochromic layer are selected from a group consisting of at least one of transition metal oxide, an intercalated compound, an organic compound, and any combination thereof.

11. The switchable image capturing system according to claim 1, wherein each of the electro-optical switches comprises a first substrate, a first transparent conductive layer, a light-shielding layer, a second transparent conductive layer, and a second substrate; the first transparent conductive layer is disposed on the first substrate, the light-shielding layer is disposed on the first transparent conductive layer, the second transparent conductive layer is disposed on the light-shielding layer, and the second substrate is disposed on the second transparent conductive layer.

12. The switchable image capturing system according to claim 11, wherein a placement position of each of the electro-optical switches is perpendicular to the direction in which the light travels.

13. The switchable image capturing system according to claim 11, wherein each of the electro-optical switches is positioned in front of each of the lens assemblies, and the first substrate and the second substrate are positioned at a side adjacent to the lens assembly.

14. The switchable image capturing system according to claim 11, wherein each of the electro-optical switches is positioned between each of the lens assemblies and each of the image sensors, and the first substrate and the second substrate are positioned at the side adjacent to the lens assembly.

15. The switchable image capturing system according to claim 11, wherein each of the electro-optical switches is positioned between two lenses adjacent to each of the lens assemblies.

16. The switchable image capturing system according to claim 11, wherein each of the electro-optical switches further comprises a sealing structure; the sealing structure is disposed between the first substrate and the second substrate and surrounds the light-shielding layer.

17. The switchable image capturing system according to claim 11, wherein materials of the light-shielding layer comprise suspended particles and a polymer dispersed liquid crystal.

18. The switchable image capturing system according to claim 11, further comprising a polarizer, the polarizer disposed between the lens assembly and the electro-optical switch.

19. The switchable image capturing system according to claim 1, wherein each of the lens assemblies comprises three lenses having refractive power, which are a first lens, a second lens, and a third lens displayed sequentially from an object side to an image side; each of the lens assemblies satisfies the following conditions:

$$0.1 \leq InTL/HOS \leq 0.95;$$

wherein, HOS is a distance from an object side surface of the first lens to an imaging surface of the image sensor on an optical axis; InTL is a distance from an object side surface of the first lens to an image side surface of the third lens on an optical axis.

20. The switchable image capturing system according to claim 1, wherein each of the lens assemblies comprises four lenses having refractive power, which are a first lens, a second lens, a third lens, and a fourth lens displayed sequentially from an object side to an image side; each of the lens assemblies satisfies the following conditions:

$$0.1 \leq InTL/HOS \leq 0.95;$$

wherein, HOS is a distance from an object side surface of the first lens to the imaging surface of the image sensor on an optical axis; InTL is a distance from an object side surface of the first lens to an image side surface of the fourth lens on an optical axis.

21. The switchable image capturing system according to claim 1, wherein each of the lens assemblies comprises five lenses having refractive power, which are a first lens, a second lens, a third lens, a fourth lens, and a fifth lens displayed sequentially from an object side to an image side; each of the lens assemblies satisfies the following conditions:

$$0.1 \leq InTL/HOS \leq 0.95;$$

wherein, HOS is a distance from an object side surface of the first lens to the imaging surface of the image sensor on an optical axis; InTL is a distance from an object side surface of the first lens to an image side surface of the fifth lens on an optical axis.

22. An image capturing system comprising the switchable image capturing system according to claim 1, wherein the switchable image capturing system is applied to and selected from the group consisting of at least one of an electronic portable device, an electronic wearable device, an electronic monitoring device, an electronic information device, an electronic communication device, a machine vision device, a vehicle electronic device, and any combination thereof.

* * * * *